US009665958B2

(12) United States Patent
Bolz et al.

(10) Patent No.: US 9,665,958 B2
(45) Date of Patent: May 30, 2017

(54) SYSTEM, METHOD, AND COMPUTER PROGRAM PRODUCT FOR REDISTRIBUTING A MULTI-SAMPLE PROCESSING WORKLOAD BETWEEN THREADS

(71) Applicant: NVIDIA Corporation, Santa Clara, CA (US)

(72) Inventors: Jeffrey Alan Bolz, Austin, TX (US); Patrick R. Brown, Wake Forest, NC (US); Tyson Bergland, San Francisco, CA (US); Alexander Lev Minkin, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 271 days.

(21) Appl. No.: 14/010,425

(22) Filed: Aug. 26, 2013

(65) Prior Publication Data

US 2015/0054836 A1 Feb. 26, 2015

(51) Int. Cl.

| | |
|---|---|
| ***G06T 1/20*** | (2006.01) |
| ***G06T 11/40*** | (2006.01) |
| ***G06F 9/38*** | (2006.01) |
| ***G06T 15/00*** | (2011.01) |

(52) U.S. Cl.

CPC ................ *G06T 11/40* (2013.01); *G06F 9/38* (2013.01); *G06T 1/20* (2013.01); *G06T 15/005* (2013.01)

(58) Field of Classification Search

USPC .......................................................... 345/505

See application file for complete search history.

(56) References Cited

U.S. PATENT DOCUMENTS

| | | | | |
|---|---|---|---|---|
| 6,614,449 | B1 | 9/2003 | Morein | |
| 6,720,975 | B1 * | 4/2004 | Dietrich, Jr. | 345/611 |
| 6,825,847 | B1 | 11/2004 | Molnar et al. | |
| 7,126,615 | B2 | 10/2006 | Liao | |
| 7,162,092 | B2 | 1/2007 | Glickman et al. | |
| 8,086,806 | B2 * | 12/2011 | Nyland et al. | 711/154 |
| 9,286,659 | B2 | 3/2016 | Minkin et al. | |

(Continued)

FOREIGN PATENT DOCUMENTS

| | | |
|---|---|---|
| CN | 101198982 A | 6/2008 |
| CN | 101620725 A | 1/2010 |

(Continued)

OTHER PUBLICATIONS

U.S. Appl. No. 13/844,147, filed Mar. 15, 2013.

(Continued)

*Primary Examiner* — Tize Ma

(74) *Attorney, Agent, or Firm* — Zilka-Kotab, PC

(57) ABSTRACT

A system, method, and computer program product are provided for redistributing multi-sample processing workloads between threads. A workload for a plurality of multi-sample pixels is received and each thread in a parallel thread group is associated with a corresponding multi-sample pixel of the plurality of pixels. The workload is redistributed between the threads in the parallel thread group based on a characteristic of the workload and the workload is processed by the parallel thread group. In one embodiment, the characteristic is rasterized coverage information for the plurality of multi-sample pixels.

19 Claims, 14 Drawing Sheets

(56) References Cited

U.S. PATENT DOCUMENTS

| | | | |
|---|---|---|---|
| 9,436,971 B2 | 9/2016 | Bolz et al. | |
| 2004/0091160 A1 | 5/2004 | Hook et al. | |
| 2005/0129318 A1 | 6/2005 | Glickman et al. | |
| 2006/0103658 A1 | 5/2006 | Liao | |
| 2007/0257935 A1 | 11/2007 | Koduri et al. | |
| 2007/0296725 A1* | 12/2007 | Steiner et al. | 345/505 |
| 2009/0091577 A1 | 4/2009 | Brothers | |
| 2009/0303245 A1* | 12/2009 | Soupikov | G06T 15/005 345/582 |
| 2011/0148919 A1 | 6/2011 | Heggelund et al. | |
| 2011/0285742 A1 | 11/2011 | Kilgard et al. | |
| 2012/0013629 A1 | 1/2012 | Fowler | |
| 2014/0267315 A1 | 9/2014 | Minkin et al. | |
| 2014/0267356 A1 | 9/2014 | Minkin et al. | |
| 2014/0267376 A1 | 9/2014 | Bolz et al. | |

FOREIGN PATENT DOCUMENTS

| | | |
|---|---|---|
| TW | I310541 B | 6/2009 |
| TW | I358046 B | 2/2012 |

OTHER PUBLICATIONS

U.S. Appl. No. 13/844,095, filed Mar. 15, 2013.
U.S. Appl. No. 13/970,542, filed Aug. 19, 2013.
Notice of Allowance from U.S. Appl. No. 13/844,095, dated Oct. 14, 2015.
Notice of Allowance from U.S. Appl. No. 13/844,147, dated Oct. 29, 2015.
Advisory Action from U.S. Appl. No. 13/970,542, dated Oct. 6, 2015.
Non-Final Office Action from U.S. Appl. No. 13/970,542, dated Dec. 22, 2015.
Office Action from Chinese Patent Application No. 201310745968.2, dated May 3, 2016.
Office Action from Chinese Patent Application No. 201310745828.5, dated Jul. 1, 2016.
Notice of Allowance from U.S. Appl. No. 13/970,542, dated Apr. 29, 2016.
Non-Final Office Action from U.S. Appl. No. 13/844,095, Mar. 3, 2015.
Office Action from Taiwan Patent Application No. 102144475, dated Mar. 20, 2015.
Non-Final Office Action from U.S. Appl. No. 13/970,542, dated Mar. 17, 2015.
Non-Final Office Action from U.S. Appl. No. 13/844,147, dated Apr. 9, 2015.
Final Office Action from U.S. Appl. No. 13/844,095, dated Aug. 20, 2015.
Final Office Action from U.S. Appl. No. 13/970,542, dated Aug. 19, 2015.
Office Action from Taiwan Application No. 102142874, dated Aug. 7, 2015.

* cited by examiner

Pseudo Code
200

```
// Obtain the (x,y) coordinates and rasterized coverage.
(x,y) = coordinates for current pixel;
coverageMask = PIXLD.COVERAGE;

while (coverageMask) {
  // Determine an index of a covered sample.
  int samp = BitScanForward(coverageMask);

  newCoverageMask = coverageMask & ~(1<<samp);

  numActive = number of threads with nonzero coverageMask;
  if (numActive <= 16) {

    identify partner thread (active or inactive);

    // Have inactive threads take work from its active partner.
    if (inactive thread && active partner exists) {
      (x,y) = (x,y) values from partner thread;
      remainingMask = newCoverageMask from partner thread;
      samp = BitScanForward(remainingMask);
    }

    // Update active coverage mask for redistributed work.
    if (active thread) {
      inactiveWorkMask = (1 << samp) from partner thread;
      newCoverageMask = newCoverageMask & ~inactiveWorkMask;
    }
  }

  // Load the data for sample <samp>
  if (samp != INVALID) {
    SULD.MS Rd, [Ra=x,y,sample<samp>]
    perform per-sample processing
    // Store the processed data to sample <samp>
    SUST.MS [Ra=x,y,sample=samp], Rb
  }
 coverageMask = newCoverageMask;
}
```

*Fig. 2*

Pseudo Code
300

```
// Obtain the (x,y) coordinates and rasterized coverage.
(x,y) = coordinates for current pixel;
coverageMask = PIXLD.COVERAGE;

while (coverageMask) {
  compute sum(popcount(coverageMask)) across all threads

  if (sum <= 32) {
    thread <i> chooses <samp> and (x,y) from the <i>th
      covered sample from the collection of "active"samples;
    coverageMask = 0;  // all remaining samples processed
  } else {
    // No redistribution,
    // each active thread processes one sample
    samp = BitScanForward(coverageMask);
    coverageMask &= ~(1<<samp);
  }

  // Process sample data for the chosen (x,y) and <samp>.
  if (samp != INVALID) {
    SULD.MS Rd, [Ra=x,y,sample<samp>]
    perform per-sample processing
    // Store the processed data to sample <i>
    SUST.MS [Ra=x,y,sample=i], Rb
  }
}
```

*Fig. 3*

Pseudo Code
650

```
// Obtain the (x,y) coordinates and rasterized coverage.
(x,y) = coordinates for current pixel;
coverageMask = PIXLD.COVERAGE;

while (coverageMask) {
  // Determine an index of a covered sample.
  int samp = BitScanForward(coverageMask);

  // Load values and sample mask for active pixels.
  (mask, data) = SULD.MS Rd, [Ra=x,y,sample = samp]
  newCoverageMask = coverageMask & ~mask;

  // Count active threads and redistribute work.
  numActive = number of threads with nonzero coverageMask.
  if (numActive <= 16) {

    identify partner thread (active or inactive);

    // Have inactive threads take work from its active partner.
    if (inactive thread && active partner has remaining work) {
      (x,y,coverageMask) = values from partner thread;
      remainingMask = newCoverageMask from partner thread;
      samp = BitScanForward(remainingMask);
      (mask, data) = SULD.MS Rd, [Ra=x,y,sample=samp]
    }

    // Update active coverage mask for redistributed work.
    if (active thread) {
      inactiveWorkMask = mask from partner thread;
      newCoverageMask = newCoverageMask & ~inactiveWorkMask;
    }
  }

  if (samp != INVALID) {
  // Do per-sample processing and store to covered samples
  SUST.MS [Ra=x,y, samplemask = mask & coverageMask]
  coverageMask = newCoverageMask;
  }
}
```

*Fig. 6B*

SYSTEM, METHOD, AND COMPUTER PROGRAM PRODUCT FOR REDISTRIBUTING A MULTI-SAMPLE PROCESSING WORKLOAD BETWEEN THREADS

FIELD OF THE INVENTION

The present invention relates to graphics processing, and more particularly to multi-sample surfaces.

BACKGROUND

When multi-sampling techniques are used to produce anti-aliased images the amount of processing for each pixel may increase as the number of samples per-pixel increases. For example, a processing thread typically processes one sample of a pixel according to a set of shader instructions. Therefore, the number of times the shader instructions are executed by a processing thread for a pixel equals the number of samples per-pixel.

In addition to increased processing, the amount of bandwidth that is consumed to transfer data between different processing units within a graphics processor also increases. The increases in processing demand and increased bandwidth consumption may result in decreased graphics processing performance and/or increased system cost.

Thus, there is a need for addressing the issues of increased processing and increased bandwidth consumption and/or other issues associated with the prior art.

SUMMARY

A system, method, and computer program product are provided for redistributing a multi-sample processing workload. A workload for a plurality of pixels is received and each thread in a parallel thread group is associated with a pixel of the plurality of pixels. The workload is redistributed between the threads in the parallel thread group based on a characteristic of the workload rasterized coverage information for the plurality of pixels and the workload is processed by the parallel thread group. In one embodiment, the characteristic is rasterized coverage information for the plurality of multi-sample pixels.

BRIEF DESCRIPTION OF THE DRAWINGS

FIG. 2 illustrates pseudo code that may be used to redistribute a multi-sample processing workload, in accordance with one embodiment;

FIG. 3 illustrates another example of pseudo code that may be used to redistribute a multi-sample processing workload, in accordance with one embodiment;

FIG. 6B illustrates another example of pseudo code that may be used to redistribute a multi-sample processing workload, in accordance with one embodiment;

DETAILED DESCRIPTION

Figure 1A:
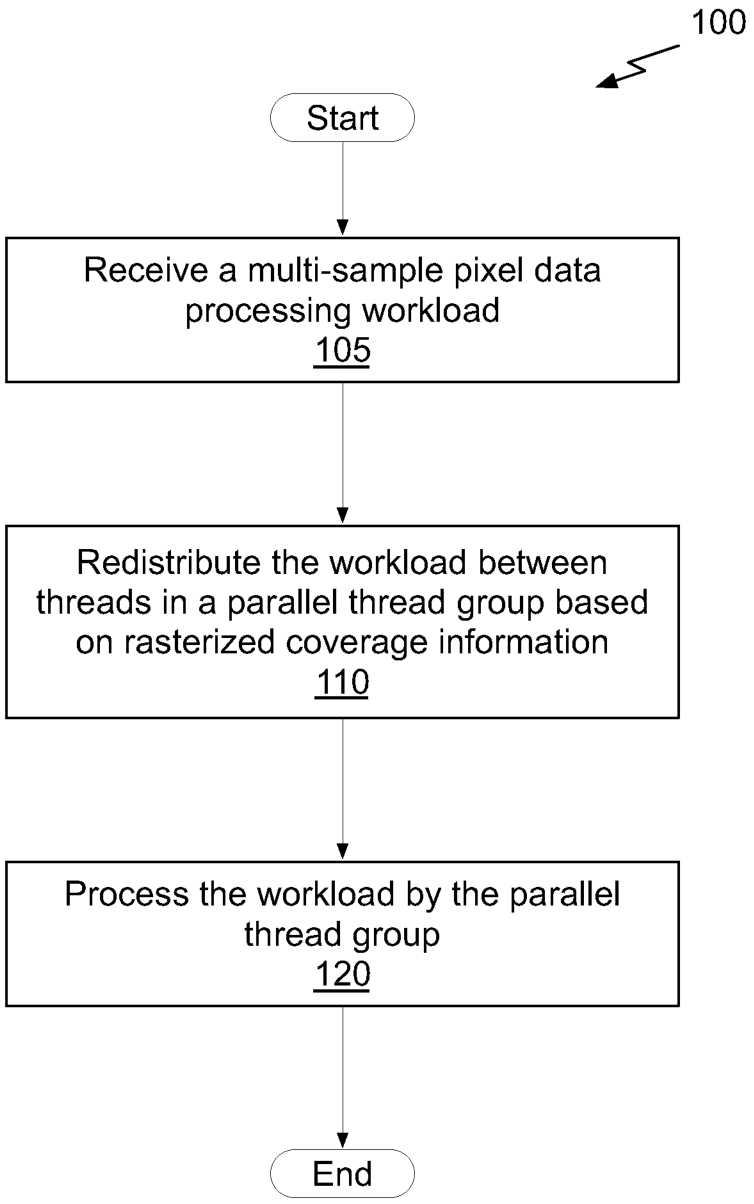
FIG. 1A illustrates a flowchart of a method for redistributing a multi-sample processing workload, in accordance with one embodiment.

In a conventional multi-threaded graphics processor, each processing thread typically processes a pixel according to a set of shader instructions. When each pixel includes multiple samples, the number of times the shader instructions that perform per-sample operations, such as blending, are executed by the processing thread equals the number of samples that are included in a pixel. The processing performance may be improved by redistributing the multi-sample processing workload between threads in a parallel thread group based on rasterized coverage of graphics primitives. Threads assigned to process pixels having one or more uncovered samples may be reassigned to process different pixels that have covered samples. The number of times that the shader instructions are executed may be reduced to be less than the number of samples per-pixel.

FIG. 1 illustrates a flowchart of a method 100 for redistributing a multi-sample processing workload, in accordance with one embodiment. At step 105, a multi-sample pixel data processing workload for a plurality of pixels is received. Each thread in a parallel thread group is associated with a corresponding pixel of the plurality of pixels. In one embodiment, the threads in the parallel thread group are executed in parallel by a multi-threaded processing unit and each one of the threads is assigned to process a particular pixel in the plurality of pixels. At step 110, the workload is redistributed between the threads in the parallel thread group based on a characteristic of the workload. In one embodiment, the characteristic may include one or more of rasterized coverage information, coverage information stored in a frame buffer memory, and color values for the plurality of multi-sample pixels. In the context of the following description, the rasterized coverage information indicates which samples within each pixel of the plurality of pixels are covered by a graphics primitive. Another characteristic may be multi-sample encoding state associated with pixel data for the plurality of pixels that is stored in the frame buffer memory. In one embodiment, the multi-sample encoding state may be used to reduce the workload.

When the processing workload is redistributed, a portion of the workload associated with at least one pixel is assigned to an additional thread for processing. At step 120, the workload is processed by the parallel thread group. In one embodiment, each thread in the parallel thread group is configured to generate, at most, one processed sample during a processing cycle, and steps 110 and 120 may be repeated until all of the covered samples have been processed.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
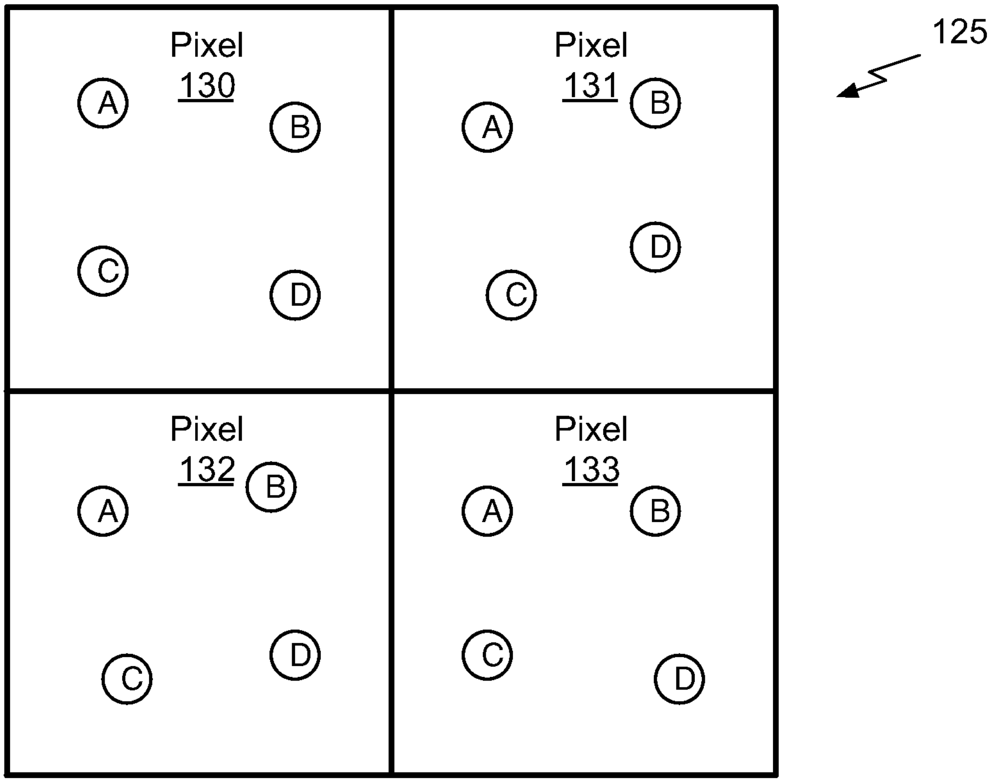
FIG. 1B illustrates a conceptual diagram of sample locations within pixels, in accordance with one embodiment.

FIG. 1B illustrates a conceptual diagram 125 of sample locations within pixels 130, 131, 132, and 133, in accordance with one embodiment. When 4×AA multi-sampling is used, each pixel includes four samples that are positioned at four different locations A, B, C, and D within the pixel. Four separate values corresponding to locations A, B, C, and D may be stored in the multi-sample surface for each pixel. The multi-sample surface may be a multi-sample z buffer or a multi-sample color buffer. In other embodiments, multi-sampling modes may include two or more samples and up to as many as 16 or more samples per-pixel.

Figure 1C:
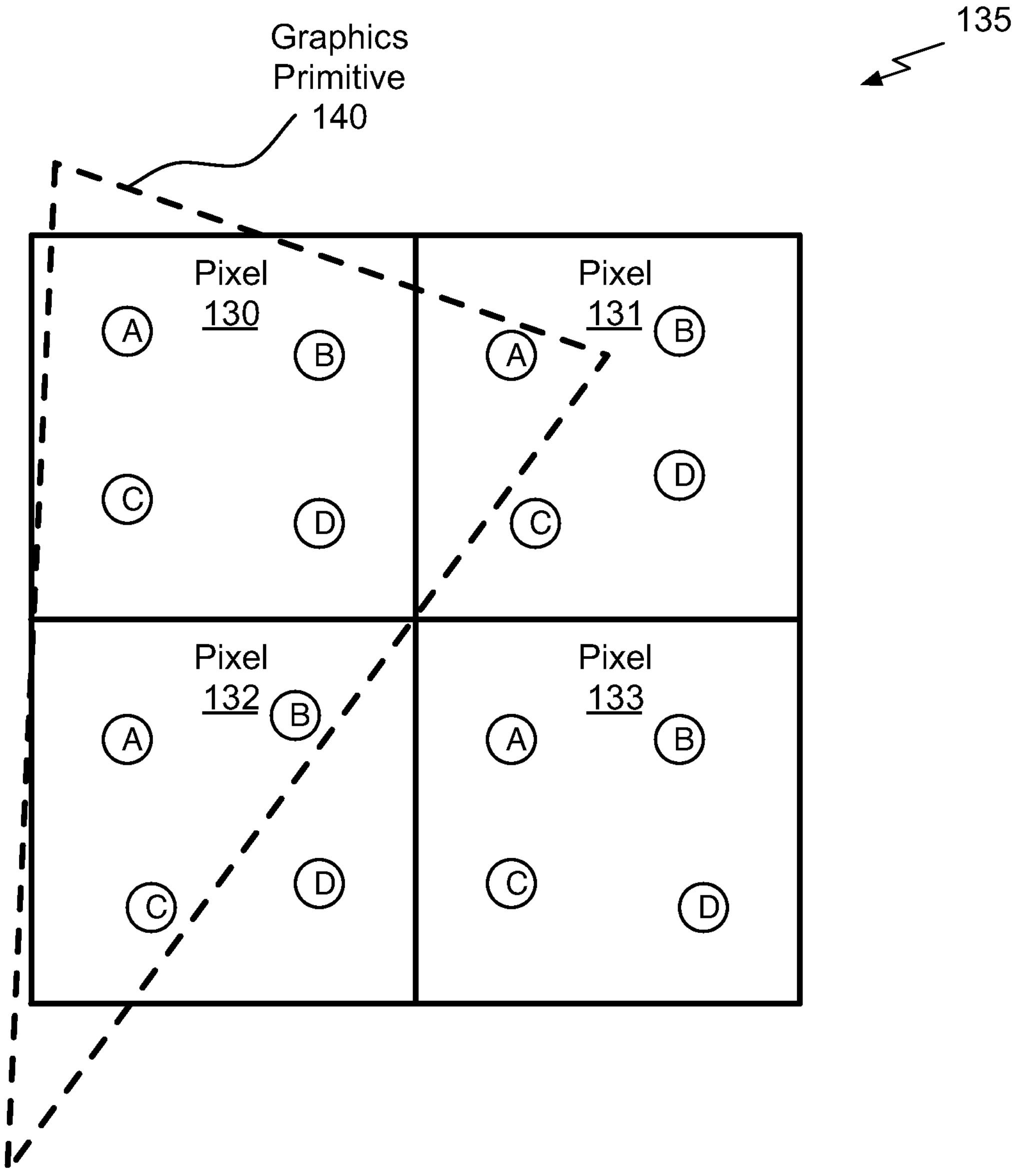
FIG. 1C illustrates another conceptual diagram of sample locations within pixels, in accordance with one embodiment.

As shown in FIG. 1C, the sample locations may be jittered (i.e., distributed) within each pixel to improve the image quality. In one embodiment, a sample location may be positioned at the center of each pixel. The multi-sample data for each sample may include z (depth), color, texture coordinates, or other attributes associated with graphics primitives.

When multi-sampling is used to perform pixel shading operations, a single color value may be computed for each pixel, and the single color value may be replicated for each sample of the pixel that is covered by a graphics primitive. However, for blending operations, the color value for each sample is combined with the color value stored in a multi-sample surface for the sample. The color value stored in the multi-sample surface may vary for different samples within a pixel when the pixel is partially covered by one or more graphics primitives. Therefore, the blending operation is typically performed for each sample rather than once for each pixel.

When a conventional multi-threaded processor blends multi-sample pixel data with data stored in a multi-sample frame buffer, a processing thread is assigned to each pixel. For example, 32 threads may be executed in parallel to process the multi-sample pixel data, so that each one of the 32 pixels is assigned to a particular one of the 32 threads. Each thread then blends one sample of the multi-sample pixel data for the assigned pixel during a processing pass during which a set of shader program instructions are executed. In one embodiment, each thread generates an attribute value (e.g., color) and the blending operation is performed in parallel by fixed function circuitry. Thus, the parallel thread group may be configured to process data using programmable circuitry and/or fixed function circuitry. As previously explained, the number of processing passes equals the number of samples per-pixel. Therefore, the number of processing passes needed to blend the samples within pixels 130, 131, 132, and 133 is four, assuming that four threads assigned to process the pixels 130, 131, 132, and 133 are in the same parallel thread group.

FIG. 1C illustrates a conceptual diagram 135 of a graphics primitive 140 that covers some of the sample locations within pixels 130, 131, 132, and 133, in accordance with one embodiment. The graphics primitive 140 covers only half of the total samples (e.g., 8 of 16) that are included in the pixels 130, 131, 132, and 133. Only three of the four pixels 130, 131, 132, and 133, have at least one covered sample.

When only some of the pixels are covered by the graphics primitive 140, and each of four threads is assigned to process a particular one of the four pixels, the thread assigned to the uncovered pixel 133 is inactive, for purposes of determining values that are stored in a frame buffer, during all of the processing passes. Rather than assigning each thread to a pixel for processing multi-sample pixel data, processing performance may be improved by redistributing the threads, so that inactive threads are assigned to process pixels that are covered by a graphics primitive. In one embodiment, the inactive threads are redistributed during each processing pass. When one or more pixels are not fully covered by a graphics primitive, two or more threads may be assigned to process a pixel that has more than one covered sample, so that the number of processing passes may be less than the number of samples per-pixel.

For example, the threads can be redistributed so that the thread associated with the pixel 133 is associated with either the pixel 130 or the pixel 132. Therefore, two threads are associated with the pixel 130 or the pixel 132 and no threads are associated with the pixel 133. When a first inactive thread is associated with the pixel 130 instead of the pixel 133, the number of processing passes is reduced from four to three and the processing performance is improved. Two threads process the four covered samples of pixel 130 during the first and second processing passes, one thread processes the covered sample of pixel 131 during the first processing pass, and one thread processed the three covered samples of pixel 132 during the first, second, and third processing passes In an embodiment that is configured to redistribute the threads for each processing pass, the newly inactive thread associated with the pixel 131 may be associated with the pixel 132 after processing the one sample in the pixel 131 that is covered by the graphics primitive 140 during the first processing pass. During the second processing pass, the two remaining samples in the pixels 130 and 132 that are covered by the graphics primitive 140 are processed by the four active threads. By redistributing the threads for each processing pass, the number of processing passes is reduced from four to two and the processing performance is improved.

Figure 1D:
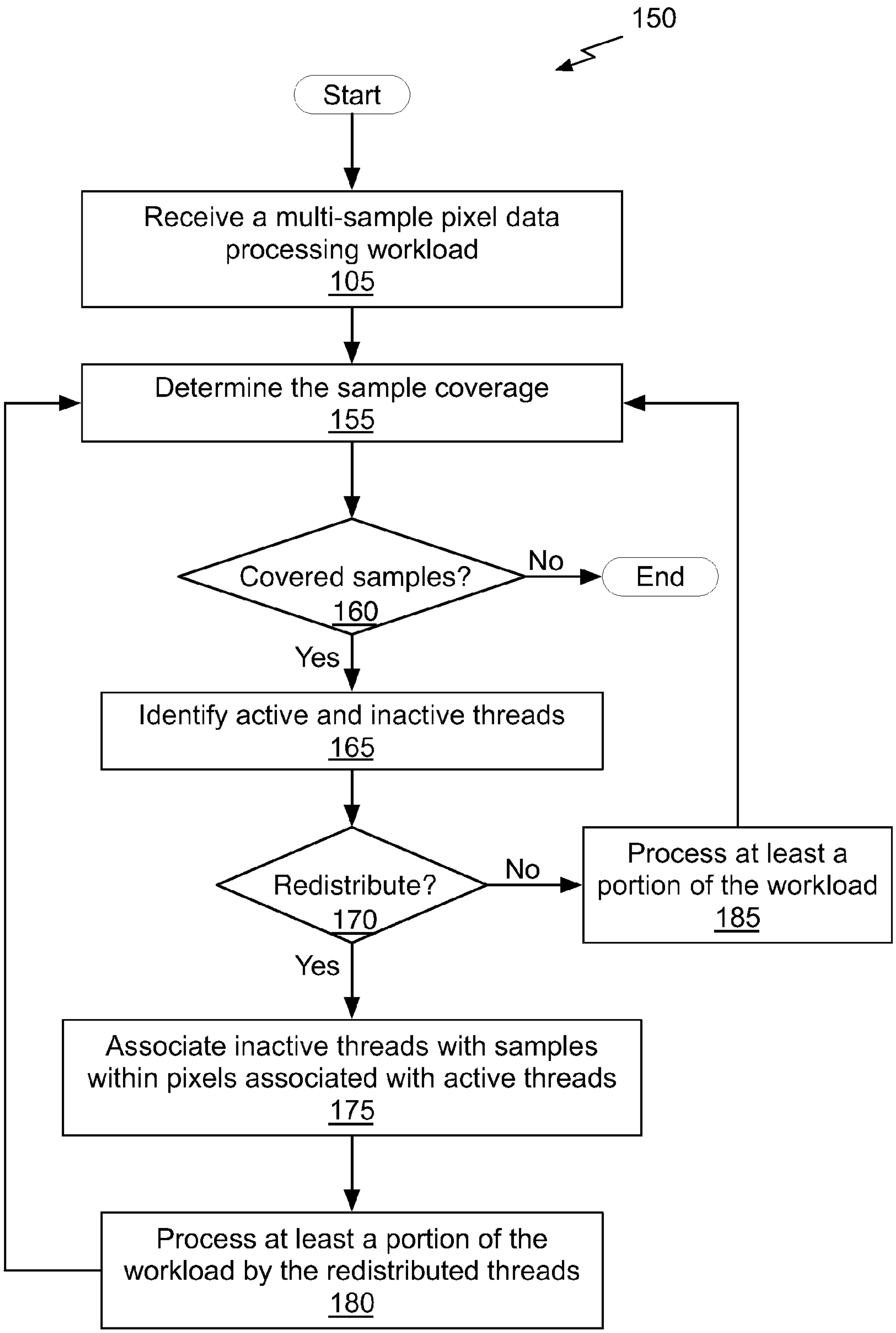
FIG. 1D illustrates a flowchart of another method for redistributing a multi-sample processing workload, in accordance with one embodiment.

FIG. 1D illustrates a flowchart of a method 150 for redistributing a multi-sample processing workload, in accordance with one embodiment. One or more of the steps shown in FIG. 1D may be performed by a scheduler unit that assigns and redistributes threads to pixels during execution of a shader program and/or during blending operations. In one embodiment, the scheduler unit maintains state information associated with each thread and the threads in a parallel thread group communicate to function in a cooperative manner. The scheduler unit is generally responsible for the cooperative behavior of the threads. In other embodiments, a different unit that is configured to assign threads to pixels may perform one or more of the steps shown in FIG. 1D.

At step 105, the scheduler unit receives a multi-sample pixel data processing workload for a plurality of pixels. The workload is a pixel processing workload that corresponds to a graphics primitive may be configured to process any attribute associated with the graphics primitive (e.g., z, color, texture coordinates, and the like). At step 155, the sample coverage is determined. In one embodiment, the scheduler unit determines the number of pixels that include at least one covered sample (i.e., covered pixels). The scheduler unit may receive rasterized coverage information (e.g., a coverage mask) for each pixel and determine the number of covered pixels based on the coverage information.

At step 160, the scheduler unit determines if any samples included in the plurality of pixels are covered by the graphics primitive. In one embodiment, the scheduler unit uses the rasterized coverage information to determine if any samples are covered. If no samples are covered by the graphics primitive, then the method terminates. Otherwise, at step 165, the scheduler unit identifies the active threads and the inactive threads in a parallel thread group that will process the workload. In one embodiment, each thread that is identified as an active thread is associated with a pixel that is covered according to the sample coverage and each thread that is identified as an inactive thread is associated with a pixel that is not covered according to the sample coverage. In one embodiment, the threads may each be associated with an index that corresponds to a particular pixel of the plurality of pixels.

At step 170, the scheduler unit determines if the threads may be redistributed, according to a redistribution criteria, to process the workload. A variety of different criteria may be defined to determine whether or not the threads are redistributed. In one embodiment, the threads may be redistributed if at least one thread is identified as inactive. In another embodiment, the threads may be redistributed if the number of inactive threads is equal or greater than the number of active threads. If, at step 170, the scheduler unit determines that the redistribution criterion is not met, then the scheduler unit proceeds to step 185 and the active threads of the parallel thread group process the multi-sample pixel data to process at least a portion of the workload.

Otherwise, at step 175, the scheduler unit associates inactive threads with samples that are within pixels associated with active threads. For example, each inactive thread may be associated or partnered with a different active thread. In another example, N−1 inactive threads may be associated with a pixel having N samples that are covered and have not yet been processed starting with the pixel having the greatest number of covered samples to be processed and continuing until all of the inactive threads have been associated with a pixel or until all of the samples will be processed in the pass. As a result of the redistribution, one or more pixels may be processed by two or more threads. In contrast, without redistribution, each pixel is only processed by a single thread. At step 180, at least a portion of the workload is processed by the redistributed threads of the parallel thread group.

After completing a processing pass in step 180 or step 185, the scheduler unit returns to step 155 to determine the sample coverage for samples that are covered and not yet processed. As a result of the processing during step 180 or 185, the number of covered samples remaining to be processed is reduced. In one embodiment, the sample coverage is updated by changing a coverage mask during one or more of steps 165, 175, 180 and 185. At step 160, the scheduler unit determines if any samples included in the pixels that are covered by the graphics primitive have not been processed. If all of the samples covered by the graphics primitive have been processed, then the method terminates. Otherwise, the scheduler unit repeats steps 165, 170, and step 185 or steps 175 and 180.

FIG. 2 illustrates pseudo code 200 that may be used to redistribute a multi-sample processing workload, in accordance with one embodiment. Multi-sample pixel data is received and is processed by a parallel thread group with sample data read from a frame buffer to generate processed multi-sample pixel data. The processed multi-sample pixel data may be written back to the frame buffer. The sample data that is stored in the frame buffer may be different for each sample of a pixel. In contrast, when the multi-sample pixel data that is received represents color data, a single color value may represent the color value for all of the samples of a pixel because a single color value is computed for each pixel that is covered by a graphics primitive.

The (x,y) coordinates are obtained for each pixel to be processed by a parallel thread group. The rasterized coverage information corresponding to the multi-sample pixel data is obtained for each pixel to be processed by the parallel thread group using the pixel load (PIXLD) instruction and is stored as a coverageMask. While coverageMask is non-zero (i.e., at least one sample is covered), the parallel thread group processes the multi-sample pixel data. First, a BitScanForward function is used to determine an index of a sample corresponding to the first set bit of each coverageMask. First, a newCoverageMask is computed for each pixel as the coverageMask with a bit corresponding to the sample to be processed cleared. Eventually, the coverageMask for each pixel is updated to equal the newCoverageMask. Second, the number of active threads are identified (e.g, numActive), where each active thread is associated with a non-zero coverageMask. In one embodiment, a VOTE.ballot instruction and a POPCount instruction (described in detail below) are used to identify the number of active threads. In other embodiments, different techniques may be used to generate the numActive value.

The VOTE.ballot instruction may be used to generate a mask indicating which threads are active that is broadcast to all of the threads. In one embodiment, each thread sets a predicate indicating that at least one sample is covered according to the coverageMask corresponding to the pixel assigned to the thread. The predicates are input to the VOTE.ballot instruction and an N-bit value is generated as the mask, where each bit corresponds to a different thread of N threads in the parallel thread group. The POPCount instruction counts the number of bits that are set in the mask to generate the numActive value.

After numActive is computed, the criteria for determining whether or not the threads will be redistributed so that inactive threads will process covered samples is evaluated. In the pseudo code 200, the criteria is numActive≤16, assuming N=32 threads in the parallel thread group. A redistribution function may be implemented by the pseudo code 200 to partner inactive threads with active threads. In one embodiment, each inactive thread computes an index J within the set of inactive threads, so that each inactive thread is associated with a unique index. Each inactive thread is associated or “partnered” with an active thread to redistribute the threads. For example, the Jth inactive thread is partnered with the Jth active thread to process a pixel assigned to the Jth active thread. In one embodiment a SHFL (shuffle) instruction is then used by each inactive thread to read the location (e.g., x and y coordinates), multi-sample data, and coverageMask of the partnered pixel. Each inactive thread then selects a covered sample to process in the partnered pixel. In one embodiment the BitScanForward operation may be used to select the sample and the bit in the coverageMask corresponding to the selected sample is cleared by the inactive thread. At this point the inactive threads that have selected a sample to process are now active threads and the redistribution operation is complete for the processing pass. Active threads are permitted to perform load and/or store operations to access memory, whereas inactive threads may not be permitted to perform load and/or store operations to access memory.

As described, some inactive threads may not be partnered with active threads, and those unpartnered inactive threads will remain inactive for the processing pass. In other embodiments, the redistribution process may be implemented in a manner that partners more than one inactive thread with each active thread to process more covered samples in a single processing pass.

Before the redistribution each inactive thread has a coverageMask==0. After the redistribution of the threads, each formerly inactive thread copies the newCoverageMask of a pixel (i.e., active pixel) assigned to an active thread with which the formerly inactive thread is partnered. The newCoverageMask is copied to a remainingMask and the (x,y) coordinates of the active pixel are also copied by the inactive thread. When the remainingMask equals zero, the formerly inactive thread is not needed to perform any processing and will not be activated. In one embodiment, when the remainingMask=0, samp is invalid. The remainingMask may equal zero when only one sample needs to be processed and that sample will be processed by the active thread or by another formerly inactive thread that is also partnered with the active thread.

The formerly inactive thread then selects the first covered sample in the remainingMask using the BitScanForward instruction. The newCoverageMask for the active thread (active before redistribution) is then updated by reading the mask of the formerly inactive partner thread (inactiveWorkMask) and clearing the corresponding bits in the newCoverageMask for the pixel.

After the redistribution of the threads, the processing pass is performed by the parallel thread group to process the multi-sample pixel data. Any inactive threads in the parallel thread group are idle during the processing pass and are not available to perform other processing. In one embodiment, as shown in the pseudo code 200, samples that are invalid (i.e., samp=INVALID) are not processed. First, sample data that is stored in the frame buffer for each sample that is associated with an active thread is read. As shown, a multi-sample load instruction, SULD.MS may be used to load the sample data into the Rd register that is allocated to each thread.

The sample data is typically processed with the multi-sample pixel data for the sample according to a pixel shader program to generate processed multi-sample pixel data that may be written back to the frame buffer. For example, the multi-sample pixel data may be blended with the pixel data to generate color values or the multi-sample pixel data may be compared with the pixel data to perform z-buffering. Other functions may be performed using the multi-sample pixel data and/or the pixel data as inputs. A function may be expressed by a shader program or may be specified as one of a standard set of blend modes. As shown in the pseudo code 200, the processed multi-sample pixel data stored in the Rb register is stored to the frame buffer using a multi-sample store instruction, SUST.MS.

FIG. 3 illustrates pseudo code 300 that may be used to redistribute a multi-sample processing workload, in accordance with one embodiment. The (x,y) coordinates are obtained for each pixel to be processed by a parallel thread group. The rasterized coverage information corresponding to the multi-sample pixel data is obtained for each pixel to be processed by a parallel thread group using the pixel load (PIXLD) instruction and is stored as a coverageMask. While coverageMask is non-zero (i.e., at least one sample is covered), the parallel thread group processes the multi-sample pixel data. First, the number of covered samples for all of the pixels to be processed is computed and stored as sum. In one embodiment, the POPCount instruction is used to configure each thread to count the number of covered samples in the pixel to be processed by the thread. The per-thread covered sample counts are then summed using a reduction operation that is executed across the parallel thread group to generate a sum of covered samples in the workload or portion of a workload. In one embodiment, a “shuffle” instruction is used to sum two values at a time to iteratively generate the sum. In other embodiments, different techniques may be used to generate the sum value.

After sum is computed, the criteria for determining whether or not the threads will be redistributed so that inactive threads will process covered samples is evaluated. In the pseudo code 300, the criterion is sum≤32, assuming there are 32 threads in the parallel thread group. When the number of covered samples does not exceed the number of threads in the parallel thread group, the threads are redistributed to process the covered samples in a single processing pass.

A redistribution function may be implemented by the pseudo code 300. In one embodiment, the covered samples are ordered in a collection and each thread selects a covered sample to process (i.e., thread <i> selects the (x,y) coordinates and the sample number of <i>th covered sample from the full set of samples to process). The coverageMask for each pixel is cleared, since all remaining covered samples are being processed and no further passes will be required. At this point the inactive threads that have selected a sample to process are now active threads and the redistribution operation is complete for the processing pass.

When the redistribution criterion is not met, the threads are not redistributed and each active thread processes one sample of the pixel that is associated with the thread during a processing pass. The BitScanForward operation is used to determine an index of a sample corresponding to the first set bit of each coverageMask (i.e., samp). Then, the coverageMask for each pixel is updated to clear the bit corresponding to the covered sample that will be processed by an active thread.

The processing pass is performed by the parallel thread group to process the multi-sample pixel data for all of the remaining covered samples. Any inactive threads in the parallel thread group are idle during the processing pass and are not available to perform other processing. In one embodiment, as shown in the pseudo code 300, samples that are invalid (i.e., samp=INVALID) are not processed. First, sample data that is stored in the frame buffer for each sample that is associated with an active thread is read. As shown, a multi-sample load instruction, SULD.MS may be used to load the sample data into the Rd register that is allocated to the active thread.

The sample data is typically processed with the multi-sample pixel data for the sample according to a pixel shader program to generate processed multi-sample pixel data that may be written back to the frame buffer. As shown in the pseudo code 300, the processed multi-sample pixel data stored in the Rb register is stored to the frame buffer using a multi-sample store instruction, SUST.MS.

While thread redistribution may be used to reduce the number of processing passes needed to process multi-sample pixel data, additional performance improvements are possible based on characteristics of the multi-sample pixel data. In particular, when the data is the same for each sample of a pixel, a single sample may be stored that represents all of the samples of a multi-sample pixel or all of the samples of a portion of a multi-sample pixel, where the portion includes two or more samples. An encoding state may be associated with the multi-sample pixel that indicates the single sample represents all of the samples, i.e., 1SPP (one sample per-pixel portion). In one embodiment, pixels are grouped into tiles and when all of the multi-sample pixels within the tile may each be represented with a respective single sample, an encoding state of 1SPP may be associated with the entire tile. When the encoding state is 1SPP, the memory footprint for storing the multi-sample pixel data is reduced and the bandwidth consumed to read, write, and transmit the multi-sample pixel data is also reduced. Furthermore, in some cases, a processing unit may be configured to process the single sample to generate processed pixel data for the single sample that represents processed multi-sample pixel data for two or more samples, or even all of the samples of a pixel. Thus, when the encoding state is 1SPP, the processing capacity needed to process a multi-sample pixel may also be reduced.

When data is read from a multi-sample surface with 4 samples per-pixel having an encoding state that is not 1SPP, four separate values corresponding to locations A, B, C, and D, shown in FIGS. 1B and 1C, are stored in the multi-sample surface for each pixel. In contrast, when the encoding state of a multi-sample surface is 1SPP, only one value is stored that represents the value for all of the samples (e.g., samples A, B, C, and D).

In addition to the pixel level, the 1SPP encoding state may be applied to tiles of pixels or even an entire surface. A pixel tile may include one or more pixels that are adjacent in screen space or in memory. A size of the tile may be specified in storage units e.g., 256 bytes, rather than as a quantity of pixels. Therefore, the number of pixels in a tile may vary based on the multi-sample mode (i.e., more samples per-pixel results in a smaller tile size). Pixels in the same tile do not necessarily need to be adjacent in screen space. In one embodiment, a pixel tile is sized to correspond to a number of pixels that may be processed in parallel within a multi-threaded graphics core.

Figure 4A:
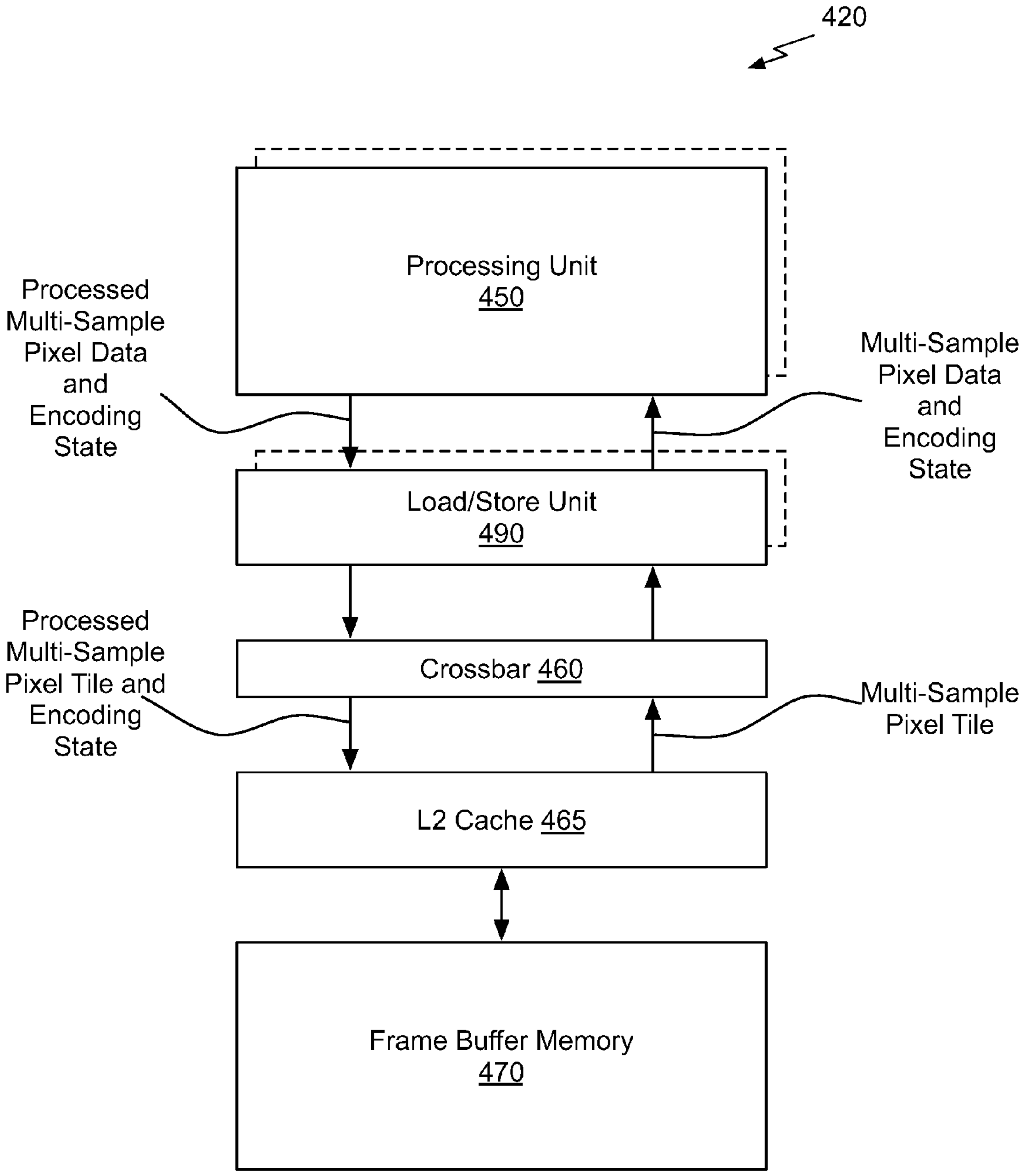
FIG. 4A illustrates a diagram of the various processing units and interconnects that are used during the multi-sample processing, in accordance with one embodiment.

FIG. 4A illustrates a diagram 420 of the various processing units and interconnections that are used during the multi-sample processing, in accordance with one embodiment. An L2 cache 465 is configured to cache data corresponding to a portion of a multi-sample surface, reading and writing a frame buffer memory 470 as needed to satisfy load and store requests that access the multi-sample surface. The L2 cache 465 may be directly coupled to the frame buffer memory 470 or the L2 cache 465 may be indirectly coupled to the frame buffer memory 470 through one or more intervening units, such as a memory controller (not shown).

In one embodiment, the L2 cache 465 stores, or otherwise obtains, the encoding state associated with the multi-sample surface. In one embodiment, the encoding state may be stored within a memory controller for each page of memory of the frame buffer memory 470. The L2 cache 465 is coupled to a Load/Store unit 490 via a crossbar 460. In one embodiment, the frame buffer memory 470 interfaces with the L2 cache 465 through multiple memory interfaces and the crossbar 460 is configured to route data between the Load/Store unit 490 and multiple L2 caches 465 coupled to different memory interfaces as needed to reach corresponding memory locations in the frame buffer memory 470. Multiple Load/Store units 490 may be coupled between the crossbar 460 and multiple processing units 450 that are configured to process pixel data.

Rather than being configured to replicate sample data for all of the samples in a multi-sample pixel when the encoding state is 1SPP to provide multi-sample pixel data to the Load/Store unit 490, the L2 cache 465 may be configured to provide the multi-sample pixel data with only one sample and the encoding state of 1SPP to the Load/Store unit 490 via the crossbar 460. Transmitting less data per-pixel over the crossbar 460 consumes less bandwidth. Because less data is transferred across the crossbar 460, less power is also consumed. Therefore, it is desirable to transmit the multi-sample pixel data using the encoding state of 1SPP. In one embodiment, the L2 cache 465 may be configured to transmit the multi-sample pixel data in tile-sized increments (1SPP format or not) to the Load/Store unit 490 via the crossbar 460. Accordingly, the Load/Store unit 490 may be configured to store multi-sample pixel data in tile-sized increments. In other embodiments, the L2 cache 465 is configured to transmit a subset of the samples for a multi-sample pixel based on a request received from the Load/Store unit 490.

The Load/Store unit 490 is configured to provide multi-sample pixel data to the processing unit 450 when a load request is received from the processing unit 450. The Load/Store unit 490 is also configured to receive processed multi-sample pixel data from the processing unit 450 and store the multi-sample pixel data. The Load/Store unit 490 may include a buffer for storing the processed multi-sample data temporarily before outputting the processed multi-sample data to the frame buffer memory 470 via the crossbar 460 and L2 cache 465. In one embodiment, the Load/Store unit 490 functions, at least in part, as a cache that is configured to buffer multi-sample pixel data received from the L2 cache 465 and processed multi-sample pixel data received from the processing unit 450 in a single buffer. When an entry is not available in the buffer to store multi-sample pixel data or processed multi-sample pixel data, one or more entries are written back to the frame buffer memory 470 (i.e., flushed) via the crossbar 460 and the L2 cache 465. When an entry has not been written with processed multi-sample pixel data received from the processing unit 450, the entry may be replaced and not flushed to the L2 cache 465.

The Load/Store unit 490 receives the multi-sample pixel data and determines the encoding state associated with the multi-sample pixel data. When the encoding state is 1SPP, data for one sample of a multi-sample pixel and the encoding state are provided to the processing unit 450. When the encoding state is not 1SPP, the Load/Store unit 490 may be configured to provide data for all samples or at least a portion of the multi-sample pixel to the processing unit 450 along with the encoding state.

In one embodiment, the processing unit 450 may be configured to load a single sample of a multi-sample pixel instead of all samples of a multi-sample pixel, and, if the single sample is returned and the encoding state for the single sample is 1SPP, the processing unit 450 processes the single sample. If the single sample is returned and the encoding state for the single sample is not 1SPP, the processing unit 450 then loads the remaining samples of the multi-sample pixel and processes all of the samples of the multi-sample pixel. By deferring loading of the remaining samples, the bandwidth consumed to transfer the multi-sample pixel data is reduced when the encoding state is 1SPP and the remaining samples are not loaded. In another embodiment, if the single sample is returned and the encoding state for the single sample is not 1SPP, the processing unit 450 issues a load request for one or more additional samples.

A multi-sample load instruction that includes a mask corresponding to samples of the multi-sample pixel may be used to load a single sample of a multi-sample pixel or to load one or more additional samples of the multi-sample pixel. In one embodiment, the multi-sample load instruction specifies an index corresponding to a sample to request the sample or a sequence of samples. When executed, the multi-sample load instruction may be configured to return the multi-sample pixel data corresponding to the sample and a mask indicating other samples in the multi-sample pixel that have the same multi-sample pixel data and/or the encoding state of the multi-sample pixel.

When the encoding state is 1SPP, the one sample of the multi-sample pixel is processed by the processing unit 450 to generate processed data for the one sample that represents processed multi-sample pixel data for all samples or at least a portion of the multi-sample pixel. When the encoding state is not 1SPP, all of the samples of the multi-sample pixel portion are processed to generate processed data for all of the samples. Therefore, when the number of samples per-pixel is 8, the amount of processing per-pixel is 8× when the encoding state is not 1SPP compared with when the encoding state is 1SPP. The processing is proportionally reduced for other numbers of samples per-pixel when the encoding state is 1SPP. Reducing the multi-sample pixel processing may improve performance and may also reduce power consumption. As described in conjunction with FIGS. 5, 6A, and 6B, in other embodiments, the processing unit 450 may be configured to process a subset of the samples and the processing unit 450 provides information (e.g., a per-pixel sample mask or per-pixel portion sample mask) indicating which samples are represented by the processed multi-sample data that is output to the Load/Store unit 490.

When the processing unit 450 is configured to perform a blending operation or a fragment shading operation, the multi-sample pixel is considered a destination pixel that is combined with source pixel data to produce the processed data for the multi-sample pixel. It is not unusual for the source pixel data to have the same value for all samples of a multi-sample pixel, such that the blending or shading operation generates processed data for a single sample that represents all samples of the processed multi-sample pixel. In this case, the processing unit 450 provides the processed data for the single sample in a store request to the Load/Store Unit 490 along with the encoding state of 1SPP. Otherwise, when processed data is generated for all of the samples, the processing unit 450 provides the processed data for all of the samples in a store request to the Load/Store Unit 490 along with the encoding state of not 1SPP. A multi-sample store instruction that includes a mask corresponding to samples of the multi-sample pixel may be used to store a value to one or more samples of a multi-sample pixel.

Efficiencies can be realized in transmitting less data for each multi-sample pixel and in processing of the data by providing the encoding state with the data for the multi-sample pixels. The amount of bandwidth that is consumed transmitting the data across the crossbar 460 may be reduced for load operations and/or store operations. A single processing thread may be allocated by the processing unit 450 to generate the data for a multi-sample pixel having the encoding state of 1SPP compared with allocating multiple threads to generate the data for a multi-sample pixel having the encoding state that is not 1SPP. In one embodiment, the Load/Store unit 490 may be configured to coalesce the data for the multi-sample pixels received from the processing unit 450 into a tile before transmitting the data over the crossbar 460 to the L2 cache 465. When an entire tile of data is transmitted to the L2 cache 465, the Load/Store unit 490 may provide the encoding state for the entire tile rather than for individual multi-sample pixels.

The Load/Store unit 490 is configured to determine the encoding state for the data that is returned to the processing unit 450 in response to a load request. In one embodiment, the encoding state is received with the data from the L2 cache 465 and the Load/Store unit 490 provides the encoding state to the processing unit 450 along with the data. In another embodiment, the Load/Store unit 490 does not receive encoding state from the L2 cache 465 and the Load/Store unit 490 is configured to compare the values of data for different samples of a multi-sample pixel or a portion of the multi-sample pixel and determine the encoding state to be 1SPP when all of the samples of a multi-sample pixel have the same value. Otherwise the Load/Store unit 490 determines that the encoding state is not 1SPP. In one embodiment, the L2 cache 465 is configured to compare the values of data for different samples of a multi-sample pixel or a portion of the multi-sample pixel and determine the encoding state for each pixel or for a tile of pixels in order to provide the encoding state to the Load/Store unit 490. As described in conjunction with FIGS. 5, 6A, and 6B, in other embodiments, the L2 cache 465 and/or the Load/Store unit 490 may be configured to compare the values of data for different samples of a multi-sample pixel or portion of a multi-sample pixel and provide information (e.g., a per-pixel sample mask or per-pixel portion sample mask) indicating which samples are represented by the processed multi-sample data that is output to the Load/Store unit 490 or the processing unit 450, respectively.

Depending on the multi-sample mode (i.e., the number of samples used for a multi-sample pixel), the Load/Store unit 490 may be configured to generate the encoding state for a partial multi-sample pixel (i.e., portion of a multi-sample pixel). For example, when a cache line is 32 bytes and a multi-sample surface stores 16 samples of 4 bytes each for each multi-sample pixel, the Load/Store unit 490 may be configured to compare 8 different samples of the multi-sample pixel and determine an encoding state for the 8 samples. Thus, each 16 sample multi-sample pixel may have two encoding states, one encoding state for each portion of samples. On the other hand, when a multi-sample surface stores 4 samples of 4 bytes each for each multi-sample pixel, the Load/Store unit 490 may be configured to compare 4 different samples for 2 different multi-sample pixels and determine one encoding state for the two different multi-sample pixels. Thus, the granularity of the encoding state may vary according to the number of comparisons made by the Load/Store unit 490 and/or the size of a cache line.

Figure 4B:
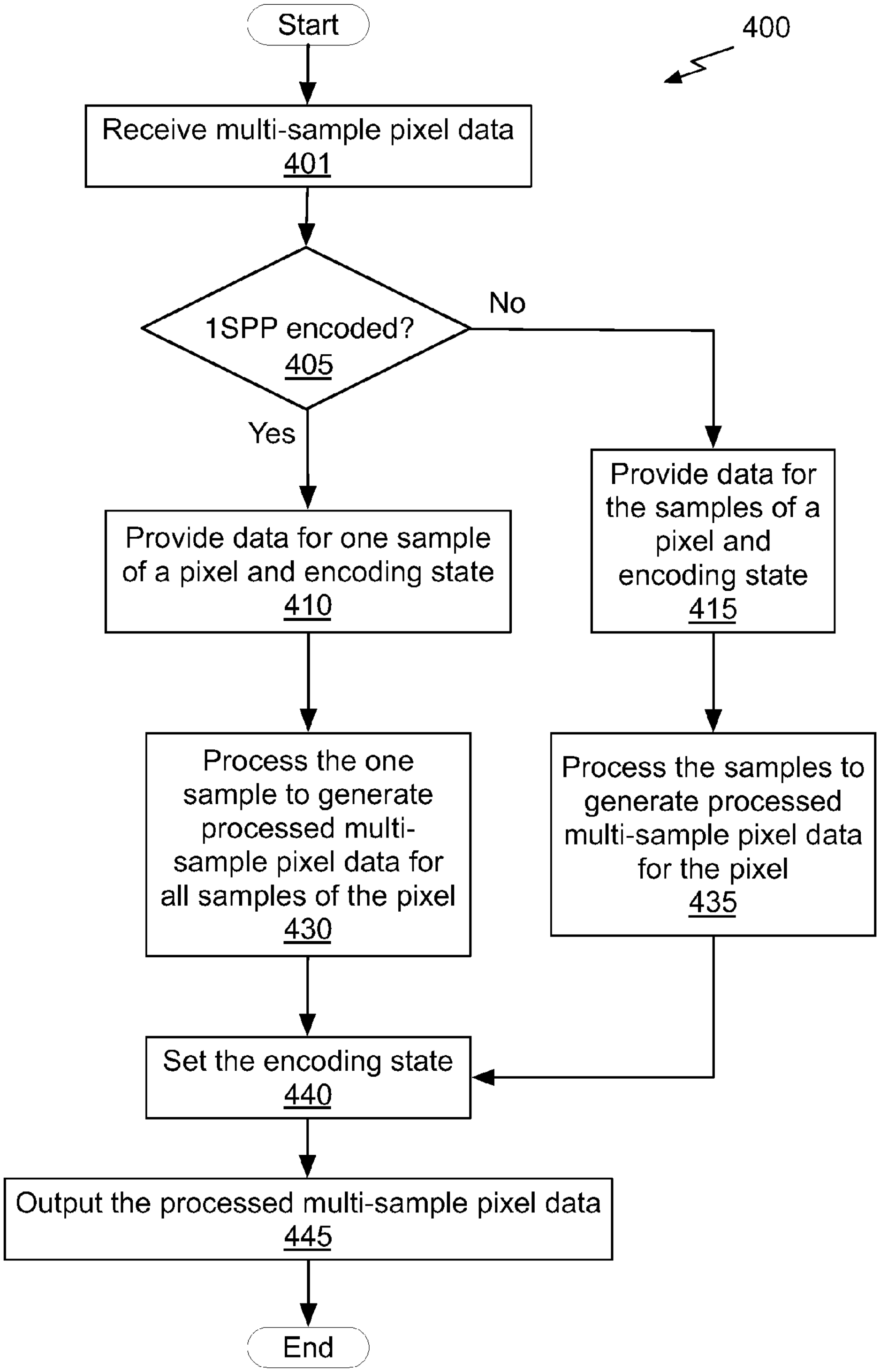
FIG. 4B illustrates a flowchart of a method for processing multi-sample data, in accordance with one embodiment.

FIG. 4B illustrates another flowchart of a method 400 for processing multi-sample data, in accordance with one embodiment. The steps shown in method 400 may be performed by a shader program that is executed by a graphics processor. At step 401, the load/store unit 490 receives multi-sample pixel data. At step 405, the load/store unit 490 determines if the encoding state associated with the multi-sample pixel data is 1SPP, and, if so, at step 410, the load/store unit 490 provides data for one sample of each multi-sample pixel or portion of a multi-sample pixel and the encoding state of 1SPP to the processing unit 450.

In one embodiment, the load/store unit 490 receives encoding state for the multi-sample pixels with the multi-sample pixel data. In another embodiment, as described in further detail in conjunction with FIG. 4B, the load/store unit 490 is configured to perform an analysis of the multi-sample pixel data to determine if the multi-sample pixel data may be encoded in 1SPP format. At step 405, when the load/store unit 490 determines that the multi-sample pixel data may be encoded in 1SPP format by analyzing the multi-sample pixel data, the encoding state is set to 1SPP. At step 430, the one sample of the pixel is processed by the processing unit 450 to generate processed data for the all samples of the pixel.

If at step 405, the load/store unit 490 determines that the encoding state associated with the multi-sample pixel data is not 1SPP, then at step 415, the load/store unit 490 may provide data for all samples of each multi-sample pixel or each multi-sample pixel portion and the encoding state to the processing unit 450. At step 415, the encoding state is set to not 1SPP and is output to the processing unit 450 along with the data for all samples of each multi-sample pixel or each multi-sample pixel portion. At step 435, the processing unit 450 processes the data for all of the samples for each multi-sample pixel or each multi-sample pixel portion.

At step 440, the processing unit 450 sets the encoding state to 1SPP or not 1SPP based on the representation of the processed data. At step 445, the processing unit 450 outputs the processed data for each multi-sample pixel or each multi-sample pixel portion to the Load/Store unit 490 along with the encoding state. The processed data may include data for the one sample or for all samples of a multi-sample pixel or for all samples of a multi-sample pixel portion.

Multi-Sample Surface Processing Using Sample Subsets

In addition to an encoding state of 1SPP and not 1SPP, an encoding state may be provided or determined that allows sample subsets for a multi-sample pixel to have the same data values, but does not require all samples in a multi-sample pixel to have the same data values. Such an encoding state is referred to as a subset encoding state. In other words, when the encoding state is subset, data for single sample may be stored that represents multi-sample pixel data for all samples in a subset of a multi-sample pixel that includes the single sample. The multi-sample pixel data is analyzed to identify subsets of samples of a multi-sample pixel that have equal data when the subset encoding state may be used.

Each subset includes at least one sample and the encoding state of subset indicates which samples are included in a subset for a multi-sample pixel. For example, the subset encoding state may include a per-pixel sample mask indicating the samples of the multi-sample pixel that are included in the subset. Typically, the subset encoding state is relevant for individual multi-sample pixels. However, the encoding state of subset may also be used for an entire tile or partial tile of multi-sample pixel data.

Figure 5:
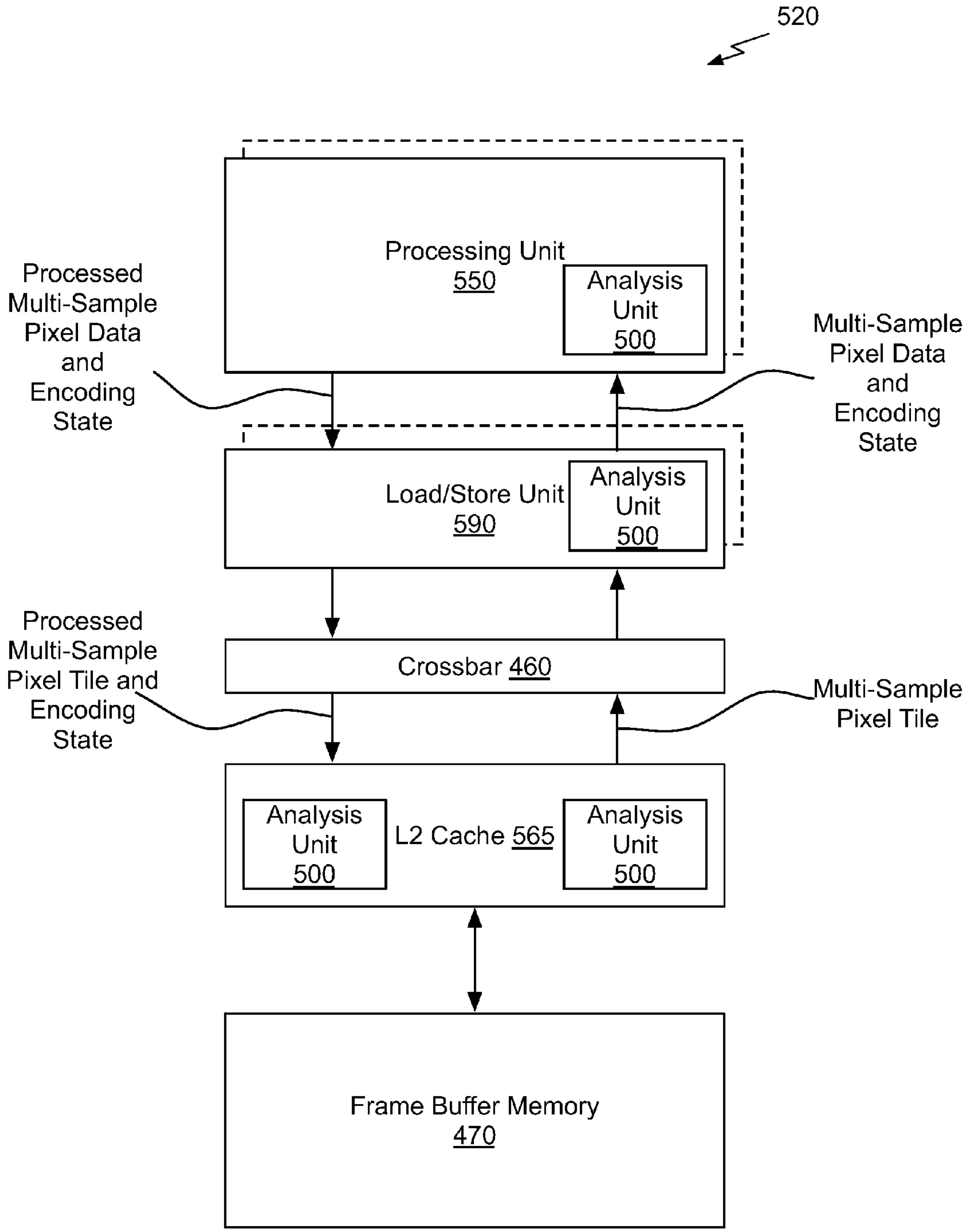
FIG. 5 illustrates another diagram of the various processing units and interconnects that are used during the multi-sample processing shown in FIG. 4A, in accordance with one embodiment.

FIG. 5 illustrates a diagram 520 of the various processing units and interconnections that are used during the multi-sample processing, in accordance with one embodiment. An L2 cache 565 performs the functions of the L2 cache 465 and may also include one or more analysis units 500 to analyze multi-sample pixel data and determine encoding state associated with the multi-sample pixel data. A processing unit 550 performs the function of the processing unit 450 and may also include an analysis unit 500 that is configured to analyze multi-sample pixel data received from a load/store unit 590 and determine encoding state associated with the multi-sample pixel data before processing the multi-sample pixel data.

The load/store unit 590 performs at least the functions of the previously described load/store unit 490. The load/store unit 590 also includes an analysis unit 500 that may be configured to analyze the multi-sample pixel data to determine if the multi-sample pixel data may be encoded in 1SPP format, as previously described. Additionally, the analysis unit 500 may be configured to analyze the multi-sample pixel data to determine if the multi-sample pixel data may be encoded with an encoding state of subset. More specifically, the analysis unit 500 may generate a per-pixel sample mask for each sample subset, where all of the samples in a subset can be represented by a single sample of the subset, i.e., the samples in the subset have the same data. The analysis unit 500 may determine the encoding state that is output to the processing unit 550. In one embodiment, the encoding state is received with the data from the L2 cache 565 and the load/store unit 590 provides the encoding state to the processing unit 550 along with the data.

In one embodiment, the analysis unit 500 in the L2 cache 565 that receives processed multi-sample data may be configured to determine the 1SPP and not 1SPP encoding state. In contrast, the analysis unit 500 in the L2 cache 565 that receives multi-sample data from the frame buffer memory 470 may be configured to determine 1SPP and subset encoding state to reduce the processing workload. The different analysis units 500 may each be configured to determine one or more of the 1SPP, not 1SPP, and subset encoding state.

Figure 6A:
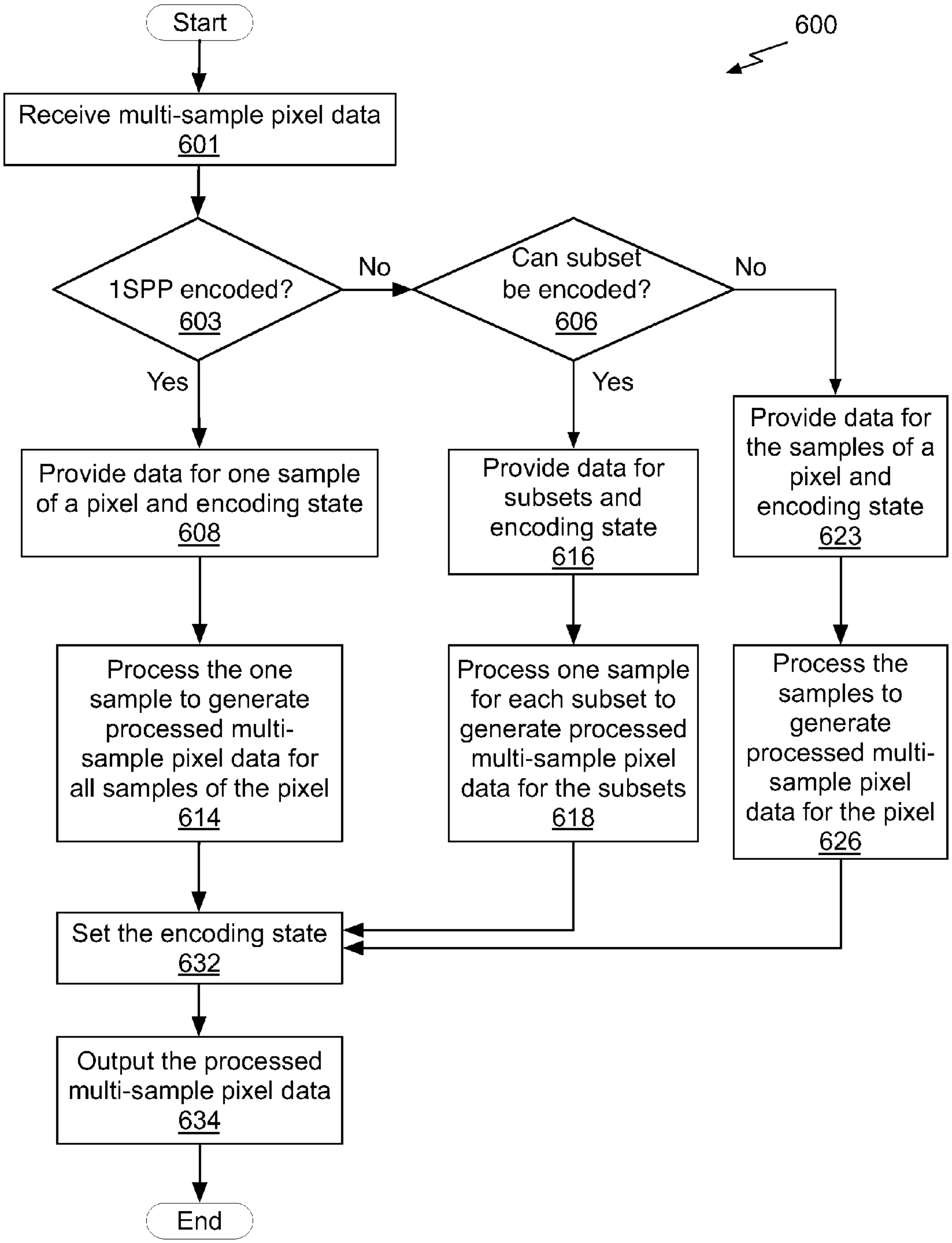
FIG. 6A illustrates another flowchart of a method for processing multi-sample data, in accordance with one embodiment.

FIG. 6A illustrates another flowchart of a method 600 for processing multi-sample data, in accordance with one embodiment. The steps shown in method 600 may be performed by a shader program that is executed by a graphics processor. At step 601, the load/store unit 590 receives multi-sample pixel data. At step 603, the load/store unit 590 determines if the encoding state associated with the multi-sample pixel data is 1SPP, and, if so, at step 608, the load/store unit 590 provides data for one sample of each multi-sample pixel or portion of a multi-sample pixel and the encoding state of 1SPP to the processing unit 550.

In one embodiment, the load/store unit 590 receives encoding state for the multi-sample pixels with the multi-sample pixel data. In another embodiment, the load/store unit 590 includes an analysis unit 500 and is configured to perform an analysis of the multi-sample pixel data to determine if the multi-sample pixel data may be associated with an encoded state of 1SPP or subset. At step 603, when the load/store unit 590 determines that the multi-sample pixel data may be encoded in 1SPP format by analyzing the multi-sample pixel data, the encoding state is set to 1SPP. At step 614, the one sample of the pixel is processed by the processing unit 550 to generate processed data for the all samples of the pixel or pixel portion.

If at step 603, the load/store unit 590 determines that the encoding state associated with the multi-sample pixel data is not 1SPP, then at step 606, the load/store unit 590 determines if the multi-sample pixel data may be associated with an encoded state of subset. At step 616, when the load/store unit 590 determines, by analyzing the multi-sample pixel data, that the multi-sample pixel data may be encoded with an encoding state of subset, the encoding state is set to subset and the corresponding per-pixel sample mask is included in the encoding state for each subset. At step 616, the encoding state is output to the processing unit 550 along with the data for one sample of each subset. At step 618, the one sample of the pixel is processed by the processing unit 550 for each subset to generate processed data for the all samples of the subsets.

If at step 606, the load/store unit 590 determines that the encoding state associated with the multi-sample pixel data is not subset, then at step 623, the load/store unit 590 may provide data for all samples of each multi-sample pixel or each multi-sample pixel portion and the encoding state to the processing unit 550. At step 623, the encoding state is set to not 1SPP and is output to the processing unit 550 along with the data for all samples of each multi-sample pixel or each multi-sample pixel portion. At step 626, the processing unit 550 processes the data for all of the samples for each multi-sample pixel or each multi-sample pixel portion.

At step 632, the processing unit 550 sets the encoding state to 1SPP, subset, or not 1SPP based on the representation of the processed data. At step 634, the processing unit 550 outputs the processed data for each multi-sample pixel, each multi-sample pixel portion, or each sample subset to the Load/Store unit 590 along with the encoding state. The processed data may include data for the one sample or for all samples of a multi-sample pixel, one sample of each sample subset, one sample for all samples of a multi-sample pixel portion, or all samples of a multi-sample pixel.

When the data is the same for one or more subsets of samples of a multi-sample pixel, the subset encoding state may be used to reduce the memory footprint for storing the multi-sample pixel data and also reduce the bandwidth consumed to read, write, and transmit the multi-sample pixel data. Furthermore, in some cases, a processing unit, such as the processing unit 450 or 550, may be configured to process the single sample to generate processed multi-sample pixel data for the single sample that represents processed multi-sample pixel data for two or more samples, or even all of the samples of a multi-sample pixel.

In one embodiment, a single sample of one pixel may represent multi-sample pixel data for two or more pixels to implement "lower-frequency shading" that enables one thread to generate processed multi-sample data for two or more pixels. When a lower-frequency shading mode is enabled and the encoding state is 1SPP, the single sample is stored to all samples of the two or more pixels. When a lower-frequency shading mode is enabled and the encoding state is subset, the single sample is stored to samples of the two or more pixels according to a sample mask corresponding to the two of more pixels. For example, a 32 bit sample mask may correspond to a 2×2 block of four pixels, each including eight samples or a 2×4 or 4×2 block of eight pixels, each including four samples.

Multi-Sample Load and Store Instructions

As previously described, a multi-sample load instruction (SULD.MS) may be supported that returns a sample mask indicating which samples are known to have the same value. The multi-sample load instruction also specifies an address or coordinates of a multi-sample pixel. In one embodiment, the multi-sample load instruction returns a predicate indicating whether the multi-sample pixel has an encoding state of not 1SPP (i.e., a separate value is stored for each sample of the multi-sample pixel). In another embodiment, the predicate indicates the encoding state of the multi-sample pixel, e.g., 1SPP, not 1SPP, or subset.

In one embodiment, inputs to the multi-sample load instruction include a pixel address and sample identifier corresponding to one sample in the multi-sample pixel. In addition to returning the data for the one sample, the multi-sample load instruction also returns an integer sample mask indicating which other samples in the multi-sample pixel are known to have the same data as the one sample. The multi-sample load instruction may be defined such that the sample mask can be computed opportunistically. For example, if the multi-sample pixel is known to be part of a tile having an encoding state of 1SPP, then the sample mask will indicate that all samples of the multi-sample pixel have the same data. When the encoding state of the multi-sample pixel is subset, the sample mask will indicate which samples are included in the same subset as the sample corresponding to the specified sample identifier. The load/store unit 490 or 590 or the L2 cache 465 or 565 may be configured to analyze the multi-sample pixel data and generate the per-pixel sample mask corresponding to the subset that includes the sample corresponding to the specified sample identifier. The generated per-pixel sample mask may be returned by the multi-sample load instruction as the sample mask. In one embodiment, the load/store unit 490 or 590 or the L2 cache 465 or 565 analyzes the other samples stored in a cache line to generate the sample mask, so the sample mask may not represent all of the samples in the subset when data for all of the samples cannot be stored in a single cache line.

Additionally, a multi-sample store instruction (SUST.MS) may be supported that accepts a sample mask, where a value provided with the multi-sample store instruction is stored to every sample of a multi-sample pixel that is enabled according to the specified sample mask. In one embodiment, a sample mask that indicates a fully covered pixel may be stored in a 1SPP format, as shown in FIG. 6A. In another embodiment, a sample mask that indicates a partially covered pixel may be stored in a subset encoding.

The code shown in Table 1 illustrates an example of how the SUST.MS and SULD.MS instructions may be used in a shader program to compute and store a function of values of samples in a pixel that are covered by a primitive.

TABLE 1

```
coverageMask=PIXLD.COVERAGE;   // read the pixel coverage mask
while (coverageMask) {
    // choose the sample of first set bit
    int samp = BitScanForward(coverageMask);
    (mask, color) = SULD.MS Rd, [Ra=x,y,sample = samp]
    Generate processed data
    // store to all covered samples that have the same color
    SUST.MS [Ra=x,y, samplemask = coverageMask & mask]
    coverageMask &= ~mask;
}
```

The pixel coverage mask indicates the sample coverage of a new primitive regardless of the values that are stored for each sample (not the sample coverage for a subset where the samples all store the same data). In each iteration of the loop, the value of one sample that is covered according to the coverageMask is loaded using the SULD.MS instruction. The SULD.MS instruction returns the per-pixel sample mask (or per-cache line sample mask). The value of the requested sample is processed to generate a processed value.

The processed data for the one sample is returned and stored to all samples that have the same value as the one sample (according to the per-pixel sample mask) and that are covered by the new primitive. The coverageMask is bit-wise ANDed with the per-pixel sample mask to ensure only samples that are covered by the new primitive are written. The coverageMask is then updated based on the samples that were written by SUST.MS. The loop is only executed for each sample subset rather than executing for each sample that is covered according to the pixel coverage mask.

In one embodiment, the processed data for the one sample is returned and stored to the one sample and the per-pixel sample mask is also stored or otherwise encoded with the pixel data. For example, when a single sample represents all samples of a pixel, the 1SPP encoding state is associated with the pixel and stored with the pixel data or a register or memory location corresponding to the portion of memory where the pixel data is stored.

In one embodiment, the analyze unit 500 is implemented as fixed-function circuitry that is configured to implement comparison operations to compute the per-pixel sample mask that is returned by the SULD.MS instruction. An example implementation uses a 32 Byte cache line size, and includes eight 4 Byte comparators. Groups of four bytes are multiplexed into the inputs of the comparators depending on the data format of the multi-sample pixel. For example, when the data format is 4BPP (e.g. RGBA8), the 8 comparators perform comparisons for 8 dwords (datawords, where a dataword is 4 bytes):

dword[i]==dword[0]
dword[i]==dword[1]
dword[i]==dword[2]
dword[i]==dword[3]
dword[i]==dword[4]
dword[i]==dword[5]
dword[i]==dword[6]
dword[i]==dword[7]

where <i> is the sample being fetched. Depending on the multi-sample mode (i.e., number of samples per-pixel), the appropriate comparisons can be merged into the per-pixel sample mask that is returned. The multi-sample mode of 8×AA (8 samples per-pixel) uses all eight comparisons, 4×AA (4 samples per-pixel) uses half of the comparisons, and so on.

If the data format of the multi-sample pixel is 8BPP (e.g. RGBA16F), the comparisons may be arranged as follows:

dword[2*i+0]=dword[0] (lower half of sample 0)
dword[2*i+1]==dword[1] (upper half of sample 0)
dword[2*i+0]==dword[2] (lower half of sample 1)
dword[2*i+1]==dword[3] (upper half of sample 1)
dword[2*i+0]==dword[4] (lower half of sample 2)
dword[2*i+1]==dword[5] (upper half of sample 2)
dword[2*i+0]==dword[6] (lower half of sample 3)
dword[2*i+1]==dword[7] (upper half of sample 3)

If the multi-sample mode is 4×AA, then the arrangement shown above can compare all of the samples in a pixel. If the multi-sample mode is 8×AA, then the arrangement shown above will only compare half of the samples in the pixel and the per-pixel sample mask represents a portion of the multi-sample pixel or another set of comparisons is performed to generate the per-pixel sample mask for the entire multi-sample pixel.

An alternate embodiment, filtering circuitry may be used to perform the comparisons. For example, the Load/Store Unit 490 or 590 may implement MIN and MAX filtering modes that modes take a bilinear footprint (four texels) and, rather than computing a weighted average, are configured to compute a component-wise minimum or maximum of the four texel values. In one embodiment the Load/Store Unit 490 or 590 includes a texture unit that is configured to perform texture operations. The texture unit may include at least four texels worth of comparators, which can be configured to perform equality comparisons, as well as the MIN and MAX filtering mode operations. Similarly, the Load/Store Unit 490 or 590 may support depth (z) comparison operations (i.e., to compare sampled values against a shader-provided "reference" value), which may be used to perform comparisons for depth values.

Sample subset encoding may be used in combination with the thread redistribution to improve processing performance. When a parallel thread group includes 32 threads, 32 pixels may be processed in a number of processing passes that is less than the number of samples per pixel. For example, when 28 of the 32 pixels are fully covered by one color, 3 of the 32 pixels are fully covered by two colors, and 1 of the 32 pixels is covered by 8 different colors the number of processing passes may be reduced from 8 with no workload redistribution to 2 with workload redistribution. In sum, the workload may be redistributed based on a characteristic of the workload, where the characteristic may include one or more of the rasterized coverage information, at least one color value for the plurality of multi-sample pixels stored in a frame buffer, a per-pixel sample mask corresponding to the at least one color value, and encoding state corresponding to the at least one color value.

FIG. 6B illustrates pseudo code 650 that may be used to redistribute a multi-sample processing workload when sample subset encoding is supported, in accordance with one embodiment. Multi-sample pixel data is received and is processed by a parallel thread group with sample data read from a frame buffer to generate processed multi-sample pixel data. When the multi-sample pixel data that is received represents color data, a single color value may represent the color value for all of the samples of a pixel because a single color value is computed for each pixel that is covered by a graphics primitive. In contrast, the sample data that is stored in the frame buffer may be different for each sample of a pixel. The sample data stored in the frame buffer may be read using a multi-sample load instruction (SULD.MS) to receive data for one sample and a sample mask. The processed multi-sample pixel data may be generated for a single sample and stored into the frame buffer for multiple samples according to the sample mask using a multi-sample store instruction (SUST.MS).

As previously described in conjunction with FIG. 3, the (x,y) coordinates and rasterized coverage information corresponding to the multi-sample pixel data is obtained for each pixel to be processed by a parallel thread group using the pixel load (PIXLD) instruction and is stored as a coverageMask. While coverageMask is non-zero (i.e., at least one sample is covered), the parallel thread group processes the multi-sample pixel data. First, the BitScanForward function is used by each active thread to determine an index of a sample corresponding to the first set bit of each non-zero coverageMask.

Second, the sample mask and multi-sample pixel data for the one sample for each pixel is read using SULD.MS and the index of the sample. Third, a new coverage mask (e.g., newCoverageMask) for each pixel is computed to clear the bits corresponding to any covered samples that are represented by the one sample that will be processed by an active thread. Then, the number of active threads is counted (e.g, numActive), where each active thread is associated with a non-zero coverageMask.

Once numActive is computed, the criteria for determining whether or not the threads will be redistributed so that inactive threads will process covered samples is evaluated. In the pseudo code 650, the criteria is numActive≤16, assuming N=32 threads in the parallel thread group, as previously described.

Before the redistribution each inactive thread has a coverageMask==0. After the redistribution of the threads, each formerly inactive thread copies the (x,y) coordinates and coverageMask of a pixel (i.e., active pixel) assigned to an active thread with which the formerly inactive thread is partnered. The newCoverageMask is copied to a remainingMask by the inactive thread. The formerly inactive thread then selects the first covered sample in the remainingMask using the BitScanForward instruction. To process the multi-sample pixel data, sample data that is stored in the frame buffer for each sample that is associated with an active thread is read, where samp is the index of the sample. As shown, a multi-sample load instruction, SULD.MS, may be used to load the sample data into the Rd register that is allocated to the active thread. A sample mask for the sample data that is read is also returned by the multi-sample load instruction. When the remainingMask equals zero, the formerly inactive thread is not needed to perform any processing and will not be activated.

Assuming a multi-sample pixel that includes four samples begins with a rasterized coverage mask, coverageMask=0xF, indicating that all four samples of the pixel are covered and the active thread associated with the pixel computes a <samp> of zero (lowest set bit), the active thread then executes a SULD.MS instruction for sample zero. If the SULD.MS instruction returns a sample mask, mask=0x5, then samples zero and two have the same coverage and a single sample may be processed to compute values for both of the samples. The active thread will use the mask=0x5 to store the processed data. The active thread computes the newCoverageMask as coverageMask & ~mask=0xA, indicating the still-unprocessed samples one and three.

If an inactive thread is partnered with the active thread, the formerly inactive partner thread copies the (x,y) coordinates and coverageMask for the active pixel. The inactive thread also copies the updated newCoverageMask of 0xA to the remainingMask, finds that sample one is the first set bit in the remainingMask, and executes a SULD.MS instruction to read the pixel data and sample mask for the sample. If the sample mask indicates that samples one and three are identical, i.e., mask=0xA, the formerly inactive partner thread will process both remaining covered samples for the pixel. If the mask=0x2, the remaining unprocessed covered sample will be processed in the next pass. The newCoverageMask for the active thread (active before redistribution) is updated by reading the mask of the formerly inactive partner thread (inactiveWorkMask) and clearing the corresponding bits in the newCoverage mask for the pixel.

At this point the inactive threads that have selected a sample to process are now active threads and the redistribution operation is complete for the processing pass. As previously explained, in one embodiment, only inactive threads having a non-zero remainingMask become active threads. In other embodiments, the redistribution process may be implemented in a manner that partners more than one inactive thread with each active thread to process more covered samples in a single processing pass and the newCoverageMasks for an active thread is updated based each of one or more formerly inactive partner threads.

After the newCoverageMask values are updated for each pixel that has a covered sample, the processing pass is performed by the parallel thread group to process the multi-sample pixel data. As shown in the pseudo code 650, the sample mask used to store the processed multi-sample pixel data is computed as mask & coverageMask and provided as an input with the processed multi-sample pixel data to be stored in the frame buffer using a multi-sample store instruction, SUST.MS. The processed multi-sample pixel data is stored for each sample based on the sample mask. The sample mask is bitwise ANDed with the coverageMask because the sample mask may indicate that one or more samples have the same attribute value stored in the frame buffer, but all of the samples corresponding to bits set in the sample mask may not be covered by the graphics primitive according to the rasterized coverage information.

When sample subset encoding is used in conjunction with a workload redistribution technique, the processing performance may be improved. The subset encoding technique may reduce the amount of processing that is needed for each pixel when sample data is common to more than one sample in a pixel. The workload redistribution technique may further improve the processing performance by redistributing the threads in a parallel thread group so that inactive threads assist active threads in processing multi-sample pixel data for sample subsets.

Parallel Processing System

Figure 7:
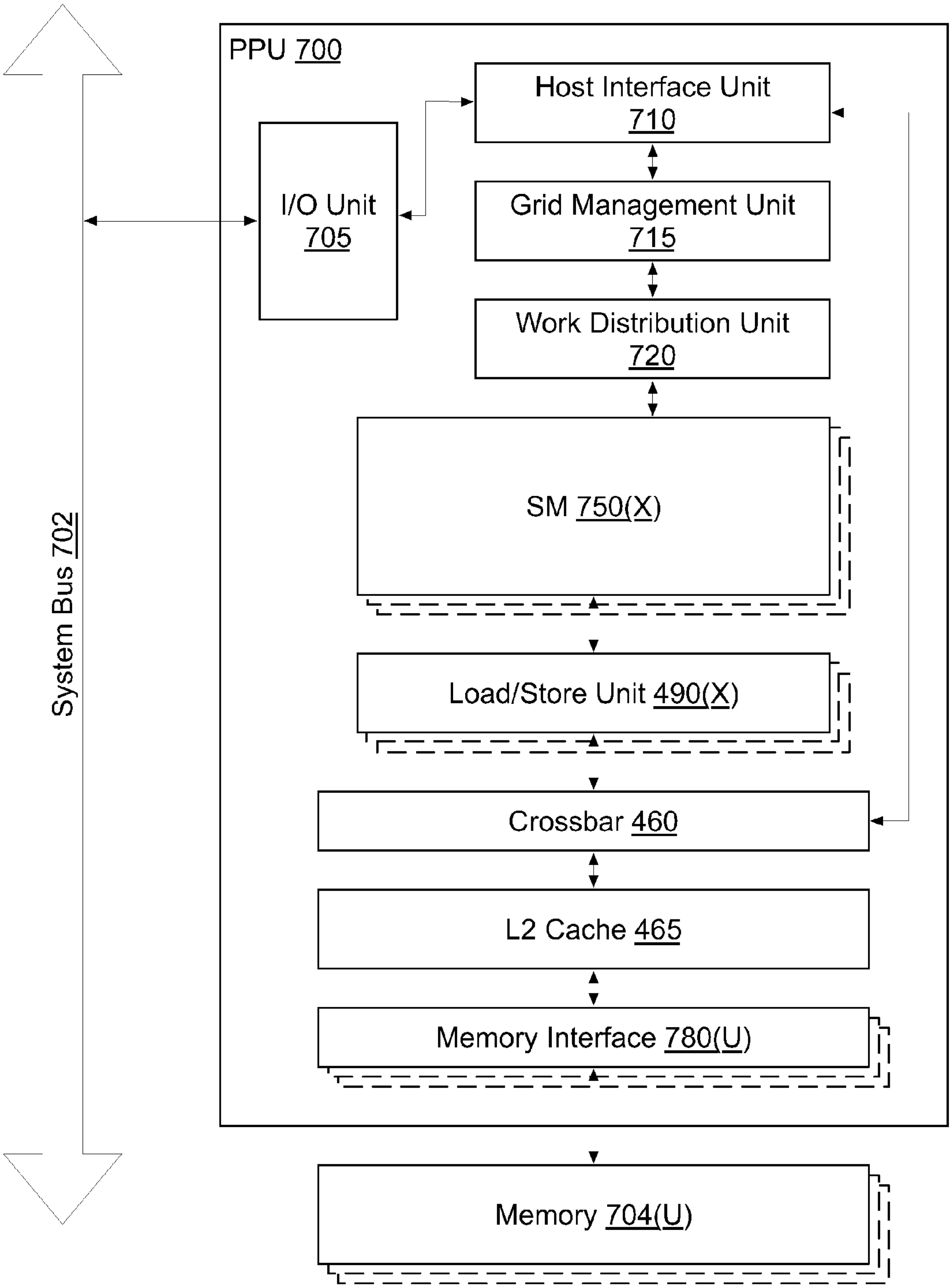
FIG. 7 illustrates a parallel processing unit (PPU), according to one embodiment.

FIG. 7 illustrates a parallel processing unit (PPU) 700, according to one embodiment. While a parallel processor is provided herein as an example of the PPU 700, it should be strongly noted that such processor is set forth for illustrative purposes only, and any processor may be employed to supplement and/or substitute for the same. In one embodiment, the PPU 700 is configured to execute a plurality of threads concurrently in two or more streaming multi-processors (SMs) 750. In one embodiment, the processing unit 450 and 550 are implemented as SMs 750. A thread (i.e., a thread of execution) is an instantiation of a set of instructions executing within a particular SM 750. Each SM 750, described below in more detail in conjunction with FIG. 8, may include, but is not limited to, one or more processing cores, a level-one (L1) cache, shared memory, and the like.

In one embodiment, the PPU 700 includes an input/output (I/O) unit 705 configured to transmit and receive communications (i.e., commands, data, etc.) from a central processing unit (CPU) (not shown) over the system bus 702. The I/O unit 705 may implement a Peripheral Component Interconnect Express (PCIe) interface for communications over a PCIe bus. In alternative embodiments, the I/O unit 705 may implement other types of well-known bus interfaces.

The PPU 700 also includes a host interface unit 710 that decodes the commands and transmits the commands to the grid management unit 715 or other units of the PPU 700 (e.g., memory interface 780) as the commands may specify. The host interface unit 710 is configured to route communications between and among the various logical units of the PPU 700.

In one embodiment, a program encoded as a command stream is written to a buffer by the CPU. The buffer is a region in memory, e.g., memory 704 or system memory, that is accessible (i.e., read/write) by both the CPU and the PPU 700. The CPU writes the command stream to the buffer and then transmits a pointer to the start of the command stream to the PPU 700. The host interface unit 710 provides the grid management unit (GMU) 715 with pointers to one or more streams. The GMU 715 selects one or more streams and is configured to organize the selected streams as a pool of pending grids. The pool of pending grids may include new grids that have not yet been selected for execution and grids that have been partially executed and have been suspended.

A work distribution unit 720 that is coupled between the GMU 715 and the SMs 750 manages a pool of active grids, selecting and dispatching active grids for execution by the SMs 750. Pending grids are transferred to the active grid pool by the GMU 715 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 720. In addition to receiving grids from the host interface unit 710 and the work distribution unit 720, the GMU 715 also receives grids that are dynamically generated by the SMs 750 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 700. An application may include instructions (i.e., API calls) that cause the driver kernel to generate one or more grids for execution. In one embodiment, the PPU 700 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 700 comprises X SMs 750(X). For example, the PPU 100 may include 15 distinct SMs 750. Each SM 750 is multi-threaded and configured to execute a plurality of threads (e.g., 32 threads) from a particular thread block concurrently. Each of the SMs 750 is connected to a level-two (L2) cache 465 via a Load/Store unit 490 and a crossbar 460 (or other type of interconnect network). The Load/Store unit 490 is configured to perform load and store operations received from the SM 750, as previously described. The Load/Store unit 590 may be used in place of the Load/Store unit 490 and the L2 cache 565 may be used in place of the L2 cache 465.

The L2 cache 465 is connected to one or more memory interfaces 780. Memory interfaces 780 implement 16, 32, 64, 128-bit data buses, or the like, for high-speed data transfer. In one embodiment, the PPU 700 comprises U memory interfaces 780(U), where each memory interface 780(U) is connected to a corresponding memory device 704(U). For example, PPU 700 may be connected to up to 6 memory devices 704, such as graphics double-data-rate, version 5, synchronous dynamic random access memory (GDDR5 SDRAM).

In one embodiment, the PPU 700 implements a multi-level memory hierarchy. The memory 704 is located off-chip in SDRAM coupled to the PPU 700. Data from the memory 704 may be fetched and stored in the L2 cache 465, which is located on-chip and is shared between the various SMs 750. The L2 cache 465 may be replaced with the L2 cache 565. In one embodiment, each of the SMs 750 also implements an L1 cache. The L1 cache is private memory that is dedicated to a particular SM 750. Each of the L1 caches is coupled to the shared L2 cache 465. Data from the L2 cache 465 may be fetched and stored in each of the L1 caches for processing in the functional units of the SMs 750.

In one embodiment, the PPU 700 comprises a graphics processing unit (GPU). The PPU 700 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 700 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc.

For example, the GMU 715 may configure one or more SMs 750 to execute a vertex shader program that processes a number of vertices defined by the model data. In one embodiment, the GMU 715 may configure different SMs 750 to execute different shader programs concurrently. For example, a first subset of SMs 750 may be configured to execute a vertex shader program while a second subset of SMs 750 may be configured to execute a pixel shader program. The first subset of SMs 750 processes vertex data to produce processed vertex data and writes the processed vertex data to the L2 cache 465 and/or the memory 704 via the LoadStore units 490 and the crossbar 460. After the processed vertex data is rasterized (i.e., transformed from three-dimensional data into two-dimensional data in screen space) to produce fragment data, the second subset of SMs 750 executes a pixel shader to produce processed fragment data, which is then blended with other processed fragment data and written to the frame buffer in memory 704. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 700 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 700 is embodied on a single semiconductor substrate. In another embodiment, the PPU 700 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 700 may be included on a graphics card that includes one or more memory devices 704 such as GDDR5 SDRAM. The graphics card may be configured to interface with a PCIe slot on a motherboard of a desktop computer that includes, e.g., a northbridge chipset and a southbridge chipset. In yet another embodiment, the PPU 700 may be an integrated graphics processing unit (iGPU) included in the chipset (i.e., Northbridge) of the motherboard.

Figure 8:
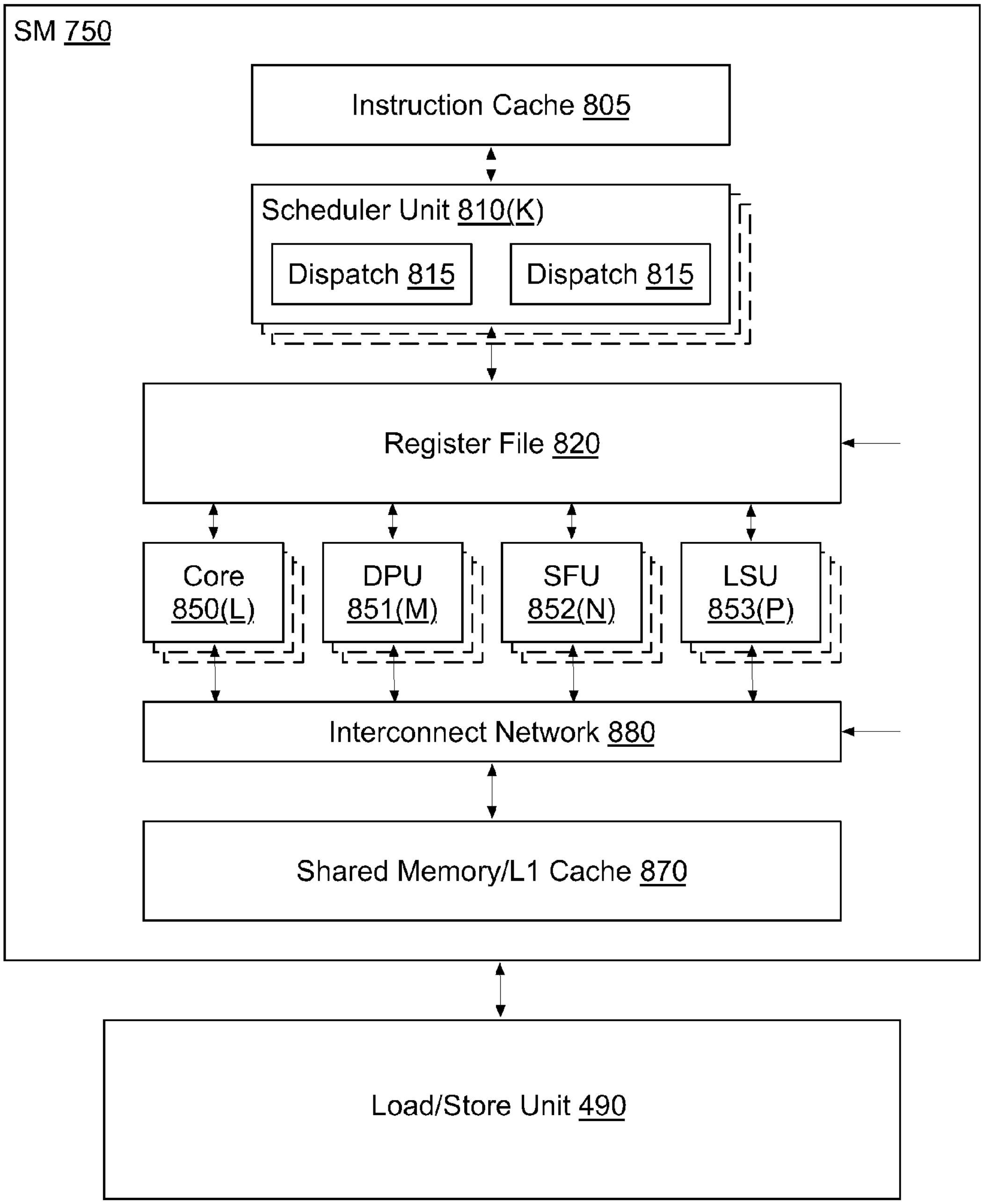
FIG. 8 illustrates the streaming multi-processor of FIG. 7, according to one embodiment.

FIG. 8 illustrates the streaming multi-processor 750 of FIG. 7, according to one embodiment. As shown in FIG. 8, the SM 750 includes an instruction cache 805, one or more scheduler units 810, a register file 820, one or more processing cores 850, one or more double precision units (DPUs) 851, one or more special function units (SFUs) 852, one or more load/store units (LSUs) 853, an interconnect network 880, and a shared memory/L1 cache 870. The SM 750 is coupled to a Load/Store unit 490. The Load/Store unit 490 may include one or more texture units in addition to the units shown in FIG. 2C.

In one embodiment, the SM 750 and Load/Store unit 490 are implemented within a GPU. In such an embodiment, the Load/Store unit 490 comprises one or more texture units that are configured to load texture maps (i.e., a 2D array of texels) from the memory 704 and sample the texture maps to produce sampled texture values for use in shader programs. The texture units implement texture operations such as anti-aliasing operations using mip-maps (i.e., texture maps of varying levels of detail).

As described above, the work distribution unit 720 dispatches active grids for execution on one or more SMs 750 of the PPU 700. The scheduler unit 810 receives the grids from the work distribution unit 720 and manages instruction scheduling for one or more thread blocks of each active grid. The scheduler unit 810 schedules threads for execution in groups of parallel threads, where each group is called a warp. In one embodiment, each warp includes 32 threads. The scheduler unit 810 may manage a plurality of different thread blocks, allocating the thread blocks to warps for execution and then scheduling instructions from the plurality of different warps on the various functional units (i.e., cores 850, DPUs 851, SFUs 852, and LSUs 853) during each clock cycle.

In one embodiment, each scheduler unit 810 includes one or more instruction dispatch units 815. Each dispatch unit 815 is configured to transmit instructions to one or more of the functional units. In the embodiment shown in FIG. 8, the scheduler unit 810 includes two dispatch units 815 that enable two different instructions from the same warp to be dispatched during each clock cycle. In alternative embodiments, each scheduler unit 810 may include a single dispatch unit 815 or additional dispatch units 815.

Each SM 750 includes a register file 820 that provides a set of registers for the functional units of the SM 750. In one embodiment, the register file 820 is divided between each of the functional units such that each functional unit is allocated a dedicated portion of the register file 820. In another embodiment, the register file 820 is divided between the different warps being executed by the SM 750. The register file 820 provides temporary storage for operands connected to the data paths of the functional units.

Each SM 750 comprises L processing cores 850. In one embodiment, the SM 750 includes a large number (e.g., 192, etc.) of distinct processing cores 850. Each core 850 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 750 also comprises M DPUs 851 that implement double-precision floating point arithmetic, N SFUs 852 that perform special functions (e.g., copy rectangle, pixel blending operations, and the like), and P LSUs 853 that implement load and store operations between the shared memory/L1 cache 870 and the register file 820. In one embodiment, the SM 750 includes 64 DPUs 851, 32 SFUs 852, and 32 LSUs 853.

Each SM 750 includes an interconnect network 880 that connects each of the functional units to the register file 820 and the shared memory/L1 cache 870. In one embodiment, the interconnect network 880 is a crossbar that can be configured to connect any of the functional units to any of the registers in the register file 820 or the memory locations in shared memory/L1 cache 870.

The PPU 700 described above may be configured to perform highly parallel computations much faster than conventional CPUs. Parallel computing has advantages in graphics processing, data compression, biometrics, stream processing algorithms, and the like.

Figure 9:
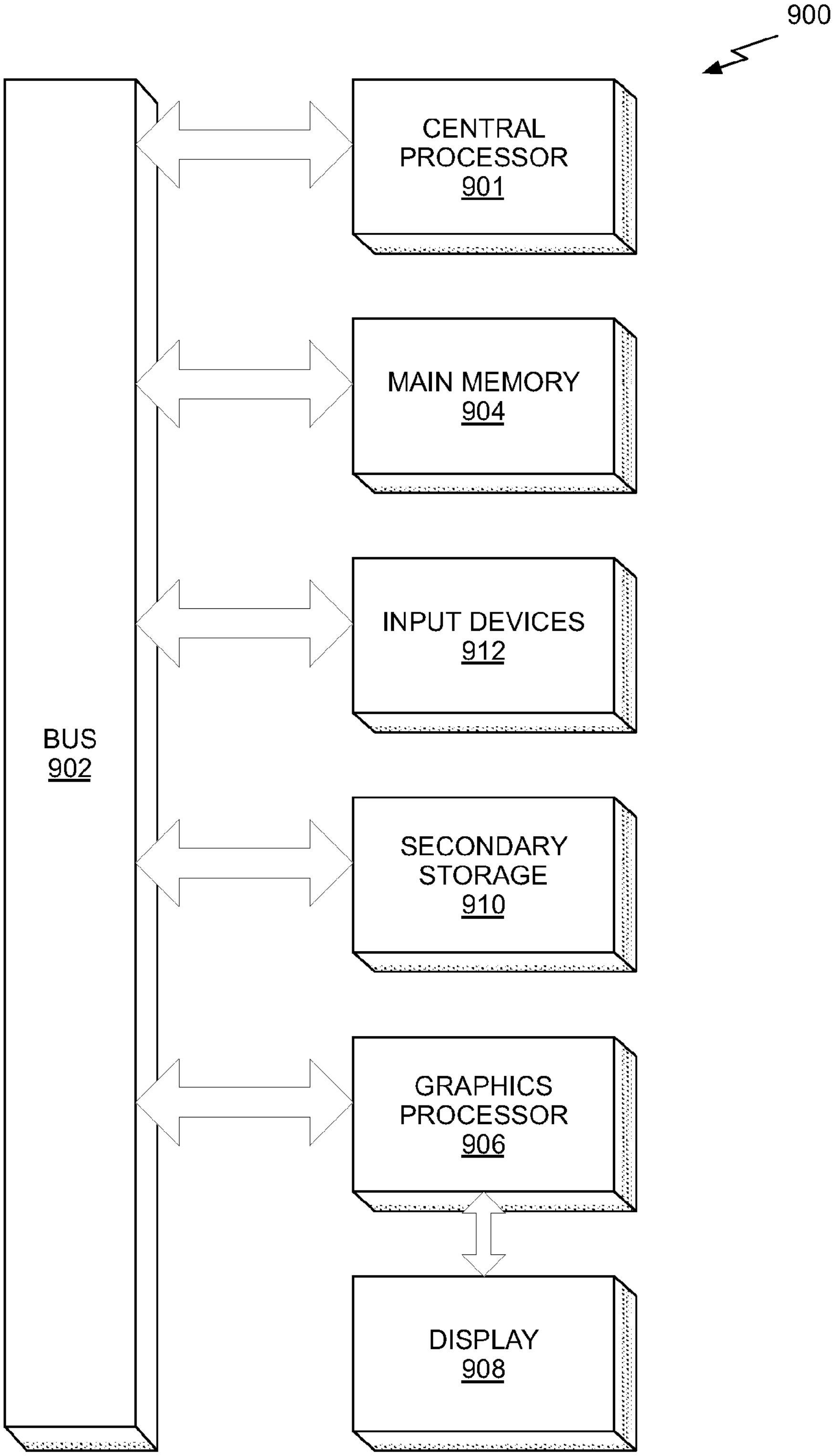
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The compiler program may be executed by the central processor 901 or the graphics processor 906. The main memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

receiving a workload for a plurality of multi-sample pixels, wherein each thread in a parallel thread group is associated with a corresponding pixel of the plurality of multi-sample pixels;

computing a value equal to a number of samples in the plurality of multi-sample pixels that are covered according to rasterized coverage information;

redistributing the workload between the threads in the parallel thread group based on the value, wherein an inactive thread in the parallel thread group that is associated with a first pixel in the plurality of multi-sample pixels is assigned to process a sample of a second pixel in the plurality of multi-sample pixels that is associated with an active thread in the parallel thread group; and processing the workload by the parallel thread group.

2. The method of claim 1, further comprising identifying active threads and inactive threads in the parallel thread group, wherein each active thread is associated with a pixel that is covered according to the rasterized coverage information and each inactive thread is associated with a pixel that is not covered according to the rasterized coverage information.

3. The method of claim 2, further comprising, prior to the redistributing, determining that the number of inactive threads is greater than or equal to the number of active threads.

4. The method of claim 1, further comprising, prior to the redistributing, determining that a number of samples in the plurality of multi-sample pixels that are covered according to the rasterized coverage information is less than or equal to the number of threads in the parallel thread group.

5. The method of claim 1, wherein the redistributing comprises enabling a number of threads as active threads equal to the value.

6. The method of claim 1, further comprising, prior to the redistributing, modifying the rasterized coverage information based on a sample mask that indicates which samples included in the second pixel are represented by a single sample that is included in the second pixel and read from a frame buffer stored in a memory.

7. The method of claim 6, wherein the processing comprises producing processed multi-sample pixel data that is stored to each sample that is enabled according to the sample mask.

8. The method of claim 7, wherein the sample mask represents sample coverage of at least the first pixel and the second pixel.

9. The method of claim 6, further comprising storing the processed multi-sample pixel data to each sample of the second pixel and at least one additional multi-sample pixel that is enabled according to the sample mask.

10. The method of claim 1, wherein the processing comprises processing a portion of the workload, and further comprising:

determining that at least one covered sample in the plurality of multi-sample pixels has not been processed by the parallel thread group; and repeating the redistributing and the processing.

11. The method of claim 1, wherein the redistributing of the workload is further based on a characteristic of the workload, comprising at least one of a per-pixel sample mask and at least one color value, the at least one color value stored in a frame buffer stored in a memory for the plurality of multi-sample pixels.

12. The method of claim 1, wherein the processing generates processed multi-sample pixel data for one sample of the second pixel in the plurality of multi-sample pixels that represents at least one additional sample of the second pixel, and further comprising storing the processed multi-sample pixel data to at least the one sample of the second pixel.

13. A system comprising:

a memory storing processed multi-sample pixel data; and scheduler unit that is configured to:

receive a workload for a plurality of multi-sample pixels, wherein each thread in a parallel thread group is associated with a corresponding pixel of the plurality of multi-sample pixels;

compute a value equal to a number of samples in the plurality of multi-sample pixels that are covered according to rasterized coverage information; and redistribute the workload between the threads in the parallel thread group based on the value, wherein an inactive thread in the parallel thread group that is associated with a first pixel in the plurality of multi-sample pixels is assigned to process a sample of a second pixel in the plurality of multi-sample pixels that is associated with an active thread in the parallel thread group; and a multi-threaded processing core that is configured to process the workload using the parallel thread group.

14. The system of claim 13, wherein the scheduler unit is further configured to identify active threads and inactive threads in the parallel thread group, wherein each active thread is associated with a pixel that is covered according to the rasterized coverage information and each inactive thread is associated with a pixel that is not covered according to the rasterized coverage information.

15. The system of claim 14, wherein the scheduler unit is further configured to assign at least one inactive thread to process a portion of the workload that is associated with an active thread.

16. The system of claim 13, wherein the scheduler unit is further configured to, prior to the redistributing, modify the rasterized coverage information based on a sample mask that indicates which samples included in the second pixel are represented by a single sample that is included in the second pixel and read from a frame buffer stored in a memory.

17. A non-transitory computer-readable storage medium storing instructions that, when executed by a processor, cause the processor to perform steps comprising:

receiving a workload for a plurality of multi-sample pixels, wherein each thread in a parallel thread group is associated with a corresponding pixel of the plurality of multi-sample pixels;

computing a value equal to a number of samples in the plurality of multi-sample pixels that are covered according to rasterized coverage information;

redistributing the workload between the threads in the parallel thread group based on the value, wherein an inactive thread in the parallel thread group that is associated with a first pixel in the plurality of multi-sample pixels is assigned to process a sample of a second pixel in the plurality of multi-sample pixels that is associated with an active thread in the parallel thread group; and processing the workload by the parallel thread group.

18. The non-transitory computer-readable storage medium of claim 17, further comprising identifying active threads and inactive threads in the parallel thread group, wherein each active thread is associated with a pixel that is covered according to the rasterized coverage information and each inactive thread is associated with a pixel that is not covered according to the rasterized coverage information.

19. The non-transitory computer-readable storage medium of claim 17, further comprising, prior to the redistributing, modifying the rasterized coverage information based on a sample mask that indicates which samples included in the second pixel are represented by a single sample that is included in the second pixel and read from a frame buffer stored in a memory.

* * * * *